US012647932B2

(12) United States Patent
Reddy

(10) Patent No.: US 12,647,932 B2
(45) Date of Patent: Jun. 2, 2026

(54) VERTICAL POSITION ESTIMATION USING WIRELESS NETWORK INFORMATION

(71) Applicant: QUALCOMM Incorporated, San Diego, CA (US)

(72) Inventor: Varun Amar Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/521,104

(22) Filed: Nov. 28, 2023

(65) Prior Publication Data

US 2025/0175928 A1 May 29, 2025

(51) Int. Cl.
*H04W 64/00* (2009.01)
*G01S 5/02* (2010.01)

(52) U.S. Cl.
CPC ........... *H04W 64/00* (2013.01); *G01S 5/0269* (2020.05)

(58) Field of Classification Search
CPC ................................................... H04W 64/00
See application file for complete search history.

(56) References Cited

U.S. PATENT DOCUMENTS

| | | | |
|---|---|---|---|
| 10,750,470 B2 * | 8/2020 | Pattabiraman .... | H04W 52/0209 |
| 2017/0230802 A1 * | 8/2017 | Lakshmi Narayanan ................... | |
| | | | H04W 4/33 |
| 2021/0029502 A1 * | 1/2021 | Lu ......................... | H04W 64/00 |

FOREIGN PATENT DOCUMENTS

| | | | | |
|---|---|---|---|---|
| WO | WO-2007100520 A1 * | 9/2007 | .......... | G01S 5/0295 |
| WO | WO-2009032788 A1 * | 3/2009 | ............. | G01S 5/014 |
| WO | WO-2019153600 A1 * | 8/2019 | ............. | H04W 64/00 |

* cited by examiner

*Primary Examiner* — William G Trost, IV
(74) *Attorney, Agent, or Firm* — Polsinelli

(57) ABSTRACT

Systems and techniques are provided for wireless communications. A process can include determining, based on an estimated vertical position of a user equipment (UE) and a configured average floor height value, a floor level estimate corresponding to the UE. A Downlink Received Signal Strength Indicator (DL-RSSI) value associated with a respective beacon frame received by the UE from each access point (AP) of a plurality of APs can be determined. A first AP group can include a first subset of the plurality of APs associated with DL-RSSI values greater than a threshold, and a second AP group can include a second subset of the plurality of APs associated with DL-RSSI values less than the threshold. The floor level estimate corresponding to the UE can be validated based on a comparison between the floor level estimate and respective floor level information associated with the first AP group.

30 Claims, 12 Drawing Sheets

500

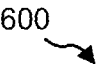
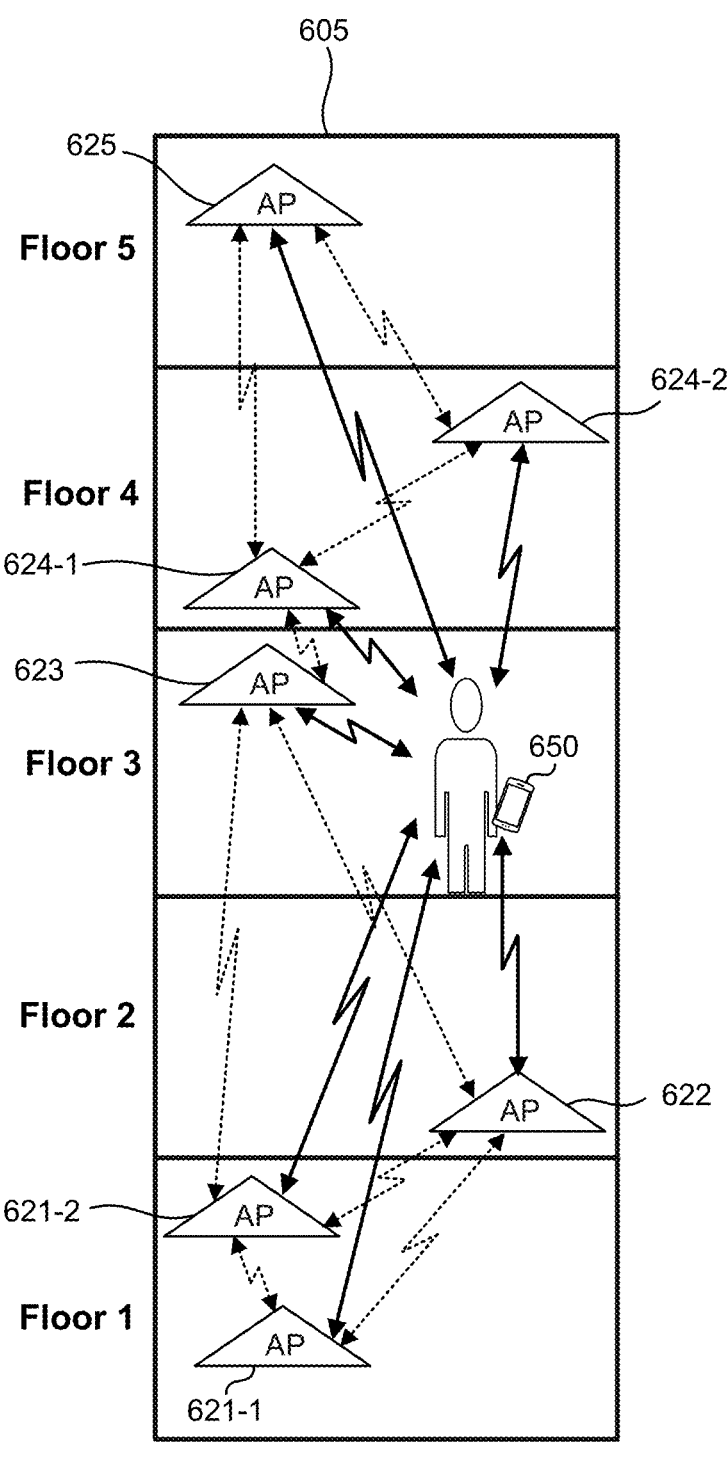
FIG. 6

700

705

714-1

714-2

Floor 5

AP

725

Floor 4

724-1

AP 724-2

746

AP

765

Floor 3

AP

723

750

Floor 2

744

722

AP 721-2

AP

Floor 1

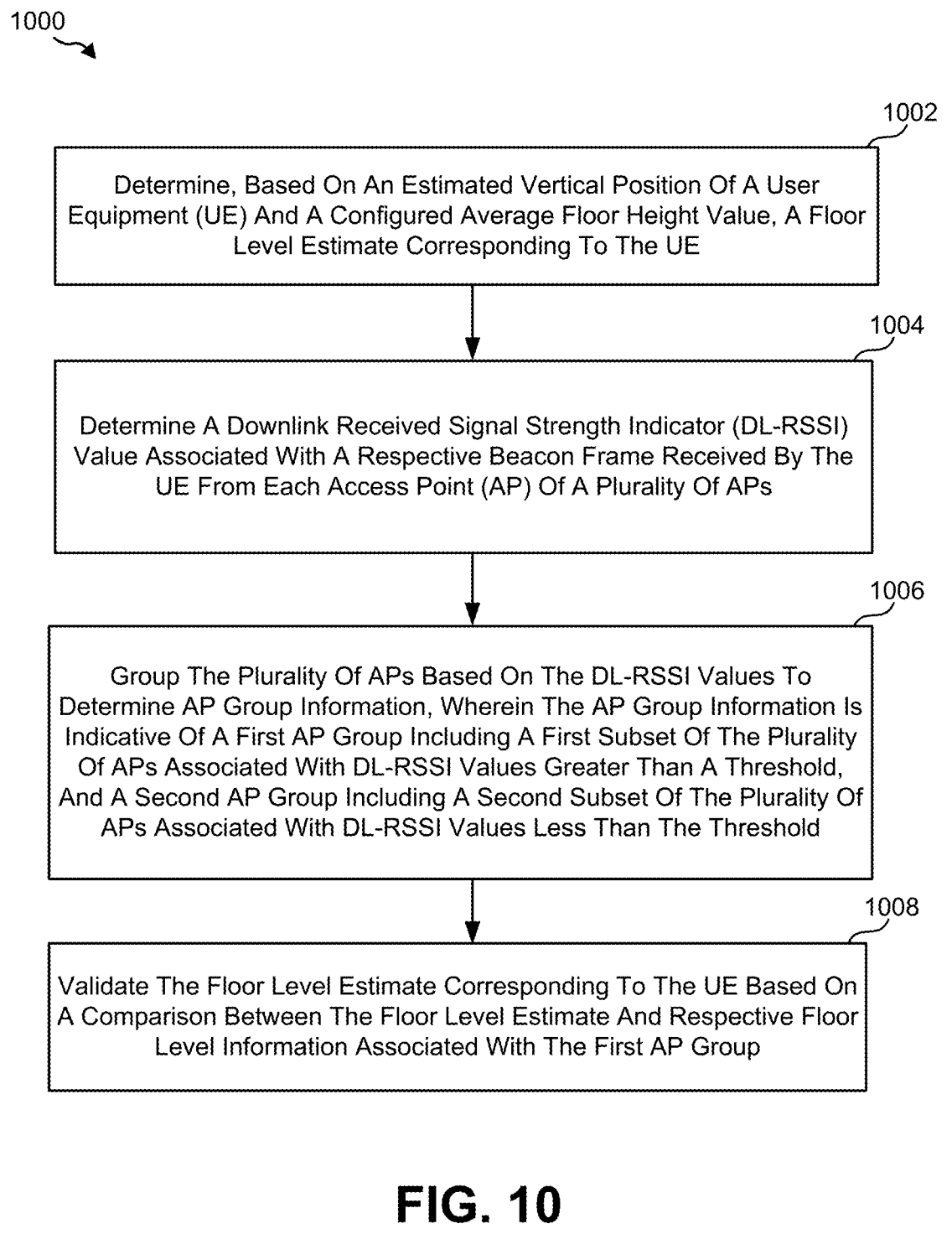

Determine, Based On An Estimated Vertical Position Of A User Equipment (UE) And A Configured Average Floor Height Value, A Floor Level Estimate Corresponding To The UE

1004

Determine A Downlink Received Signal Strength Indicator (DL-RSSI) Value Associated With A Respective Beacon Frame Received By The UE From Each Access Point (AP) Of A Plurality Of APs

1006

Group The Plurality Of APs Based On The DL-RSSI Values To Determine AP Group Information, Wherein The AP Group Information Is Indicative Of A First AP Group Including A First Subset Of The Plurality Of APs Associated With DL-RSSI Values Greater Than A Threshold, And A Second AP Group Including A Second Subset Of The Plurality Of APs Associated With DL-RSSI Values Less Than The Threshold

1008

Validate The Floor Level Estimate Corresponding To The UE Based On A Comparison Between The Floor Level Estimate And Respective Floor Level Information Associated With The First AP Group

FIG. 10

VERTICAL POSITION ESTIMATION USING WIRELESS NETWORK INFORMATION

FIELD

The present disclosure generally relates to positioning in wireless communication systems. For example, aspects of the present disclosure relate to vertical position estimation and/or floor level estimation of a user equipment (UE).

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communication is provided, comprising: determining, based on an estimated vertical position of a user equipment (UE) and a configured average floor height value, a floor level estimate corresponding to the UE; determining a downlink Received Signal Strength Indicator (DL-RSSI) value associated with a respective beacon frame received by the UE from each access point (AP) of a plurality of APs; grouping the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validating the floor level estimate corresponding to the UE based on a comparison between the floor level estimate and respective floor level information associated with the first AP group.

In another illustrative example, an apparatus of a user equipment (UE) for wireless communication is provided. The apparatus includes at least one memory and at least one processor coupled to the at least one memory and configured to: determine, based on an estimated vertical position of the UE and a configured average floor height value, a floor level estimate corresponding to the UE; determine a downlink Received Signal Strength Indicator (DL-RSSI) value associated with a respective beacon frame received by the UE from each access point (AP) of a plurality of APs; group the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validate the floor level estimate corresponding to the UE based on a comparison between the floor level estimate and respective floor level information associated with the first AP group.

In another illustrative example, a non-transitory computer-readable storage medium comprising instructions stored thereon which, when executed by at least one processor, causes the at least one processor to: determine, based on an estimated vertical position of a user equipment (UE) and a configured average floor height value, a floor level estimate corresponding to the UE; determine a downlink Received Signal Strength Indicator (DL-RSSI) value associated with a respective beacon frame received by the UE from each access point (AP) of a plurality of APs; group the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validate the floor level estimate corresponding to the UE based on a comparison between the floor level estimate and respective floor level information associated with the first AP group.

In another illustrative example, an apparatus is provided for wireless communication. The apparatus includes: means for determining, based on an estimated vertical position of a user equipment (UE) and a configured average floor height value, a floor level estimate corresponding to the UE; means for determining a downlink Received Signal Strength Indicator (DL-RSSI) value associated with a respective beacon frame received by the UE from each access point (AP) of a plurality of APs; means for grouping the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and means for validating the floor level estimate corresponding to the UE based on a comparison between the floor level estimate and respective floor level information associated with the first AP group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of vertical position estimation based on signaling information and/or measurements between a UE and a plurality of wireless access points (APs), in accordance with some examples;

FIG. 7 is a diagram illustrating another example of vertical position estimation based on signaling information and/or measurements between a UE and a plurality of wireless APs, in accordance with some examples;

FIG. 10 is a flow diagram illustrating an example of a process for wireless communications at a UE, in accordance with some examples.

DETAILED DESCRIPTION

Figure 1:
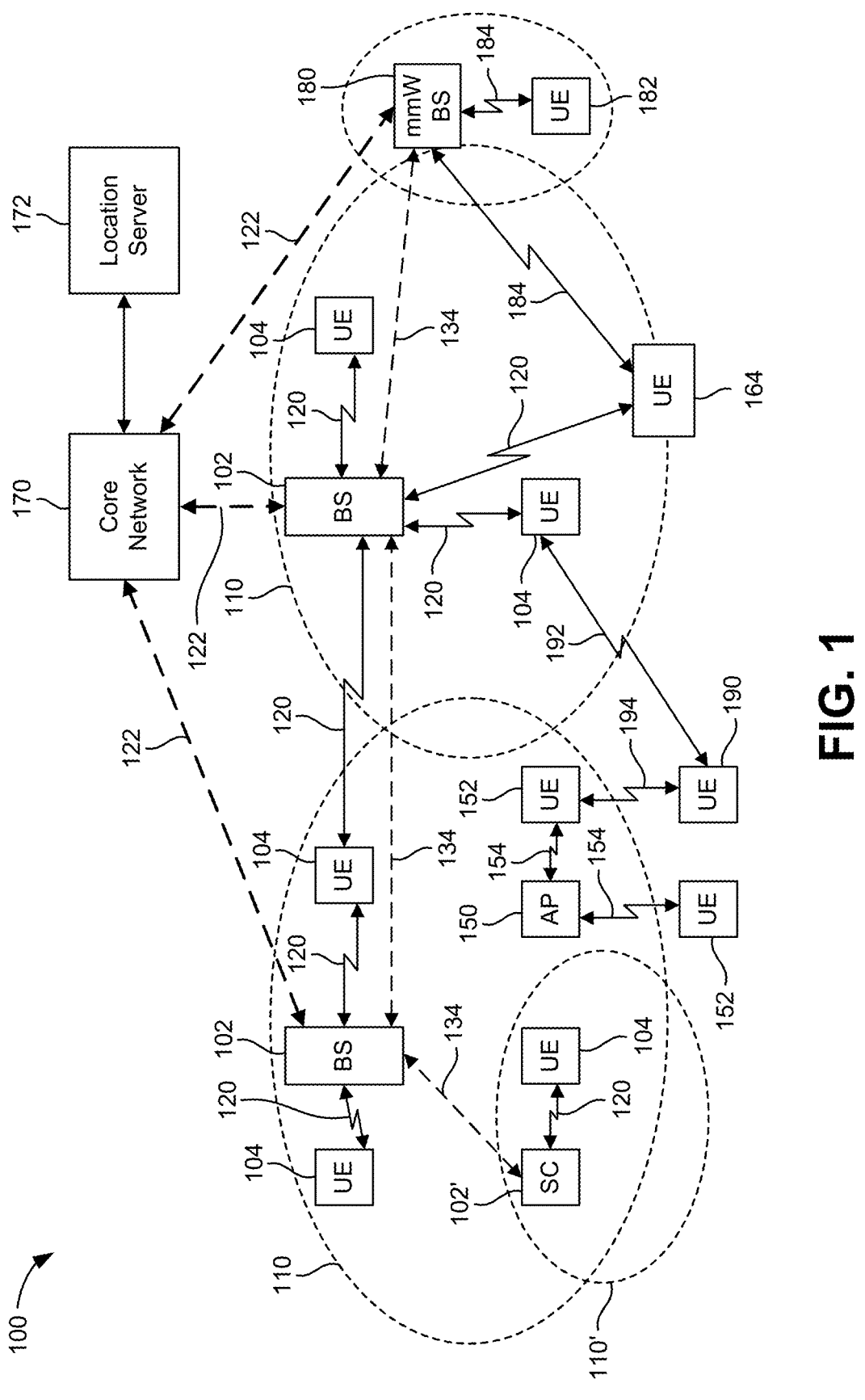
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims. The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Various aspects relate generally to wireless communication and more particularly to positioning in wireless communication systems. Some aspects more specifically relate to vertical position estimation and/or floor level estimation of a wireless communication device, such as a user equipment (UE). In some examples, a UE can determine a vertical position or floor level estimation (e.g., corresponding to a height of the UE) based on measuring one or more wireless communication signals associated with each access point (AP) of a plurality of APs. In some cases, a UE can determine its vertical position or floor level estimation based on determining a downlink received signal strength indicator (DL-RSSI) value for a respective WiFi beacon transmitted by each AP of a plurality of APs. For instance, the UE can classify the respective APs of the plurality of APs into different groups or groupings based on the measured DL-RSSI of the WiFi beacon transmitted by each respective AP and received by the UE. In some aspects, the UE can classify the plurality of APs into different groups where each group corresponds to a different floor level (e.g., different vertical position or height) and a different range or threshold of measured DL-RSSI value(s). For example, the set of APs with the strongest DL-RSSI measured by the UE may each be located on the same floor (or within one floor) of the UE's current vertical position (e.g., floor level), and the UE may estimate its vertical position or floor level based on the corresponding vertical position or floor level information of the set of APs with the strongest DL-RSSI measurements. In some aspects, the broadcast Service Set Identifier (SSID) of an AP can be mapped to a corresponding vertical position or floor level of the AP. In another example, a UE can utilize DL-RSSI values determined for a plurality of WiFi beacons transmitted by a plurality of APs to refine an initial vertical position (e.g., floor level) estimate of the UE. For instance, the UE may initially estimate its vertical position or floor level based on positioning signaling between the UE and one or more base stations (e.g., 5G NR gNodeBs (gNBs), 4G LTE evolvedNodeBs (eNBs), etc.). In some cases, the UE can initially estimate its vertical position or floor level based on a barometer and/or pressure-based sensor measurement determined by a corresponding barometer or pressure sensor included in the UE. The UE can subsequently measure the DL-RSSI of each WiFi beacon of a plurality of WiFi beacons received by the UE from nearby APs, and can classify or group the APs based on the respective DL-RSSI measurements to validate and/or refine the initial vertical position or floor level estimate of the UE. In some examples, the one or more base stations can be configured to perform positioning measurements with the UE and with one or more (or all) APs of the plurality of APs. For example, positioning measurements from the one or more base stations to the UE and/or the plurality of APs can be based on zenith angle of arrival (ZoA) information and/or zenith angle of departure (ZoD) information.

Particular aspects of the subject matter described in this disclosure can be implemented to realize one or more of the following potential advantages. In some examples, by utilizing multiple radio frequency (RF) and/or wireless communication systems, the described techniques can be used to improve floor level estimation performance for UEs and other wireless communication devices. WiFi infrastructure (e.g., the plurality of APs transmitting the corresponding plurality of WiFi beacons used by the UE to determine DL-RSSI measurements) is widespread and often available in indoor environments, including within large buildings or other multi-level structures where existing cellular network-based positioning measurements are unavailable or inaccurate. For example, indoor environments (e.g., building interiors, among various other enclosed structures, etc.) may be associated with unavailable and/or inaccurate vertical positioning measurements using cellular positioning signals, due to the attenuation (e.g., of the cellular positioning signals) caused by the floors and walls of the building. By utilizing signal strength measurements (e.g., DL-RSSI, etc.) of periodic transmissions (e.g., beacons, etc.) from a plurality of APs that are co-located within the same indoor environment as the UE (e.g., WiFi APs, Bluetooth Low Energy (BLE) APs, Ultra-Wideband (UWB) APs, etc.), aspects of the present disclosure can be used to improve or refine a relatively inaccurate initial vertical position floor level estimate that is determined by a UE (e.g., an initial UE floor level estimate based on cellular positioning signals, barometer measurements, etc.). By utilizing vertical position estimates determined between a base station (e.g., eNB, gNB, etc.) and a plurality of APs, aspects of the present disclosure may increase redundancy and increase the probability of determining an accurate vertical position or floor level estimate for the UE. For instance, the vertical position estimate determined between a base station and an individual AP of the plurality of APs may be inaccurate, particularly within an indoor environment. By analyzing (e.g., classifying or grouping) the respective vertical position estimates determined for a plurality of APs, a UE can more accurately determine its relative vertical position with respect to the plurality of APs and/or can more accurately refine an initial vertical position estimate between the UE and one or more base stations.

Additional aspects of the present disclosure are described below with reference to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), a network-connected wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eIBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y'.

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
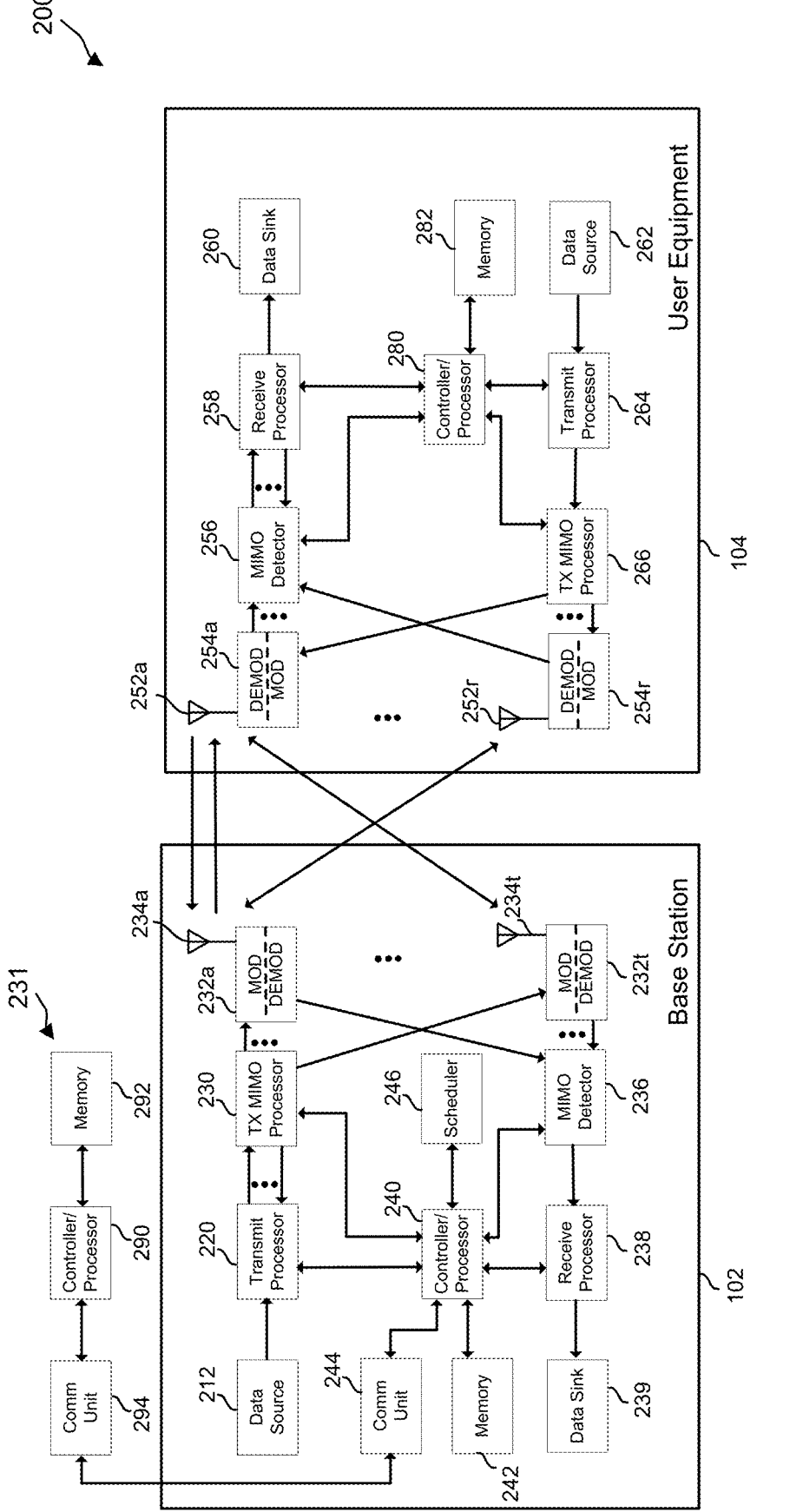
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components)

performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), and/or a virtual radio unit (VRU), etc.).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
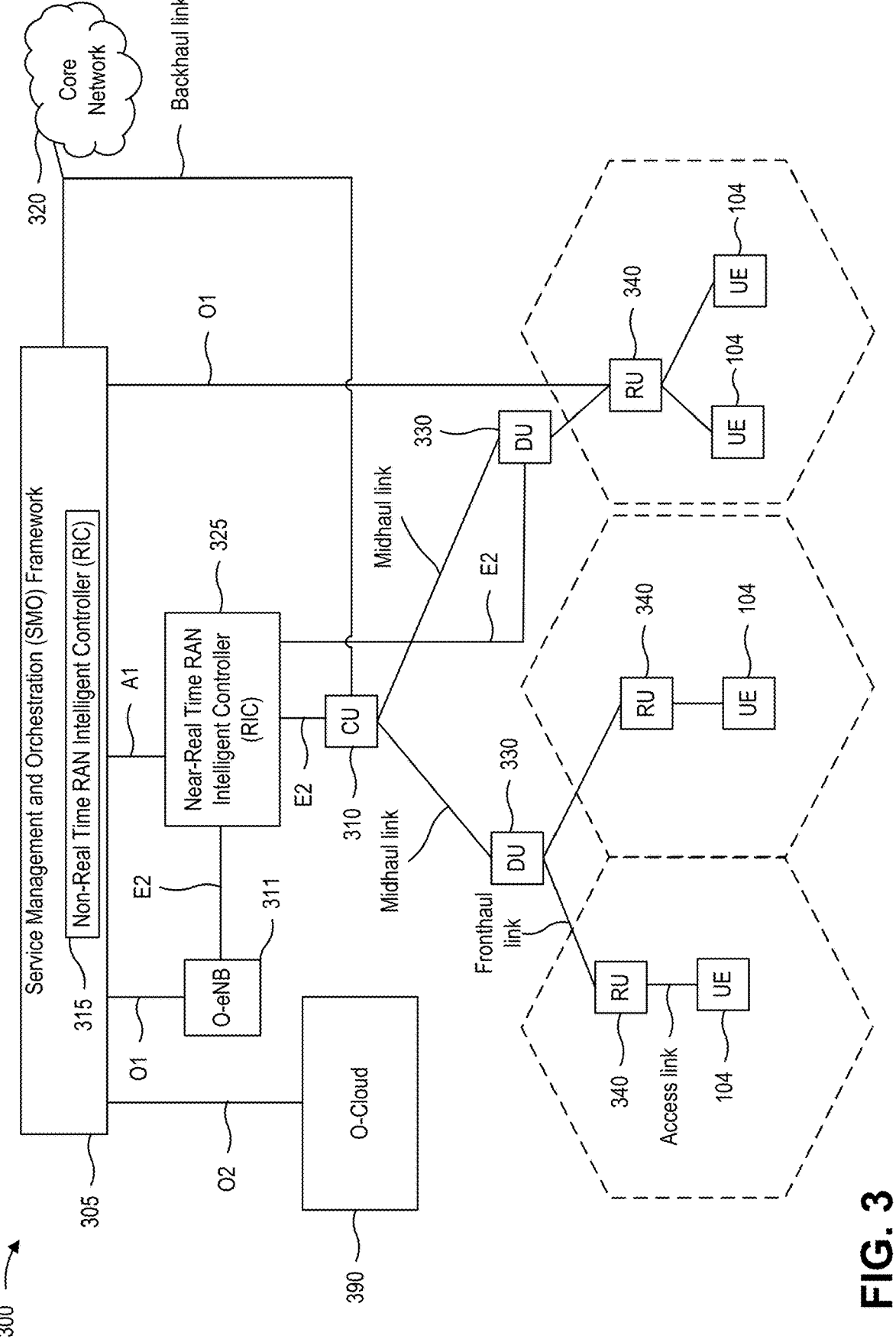
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud)

390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
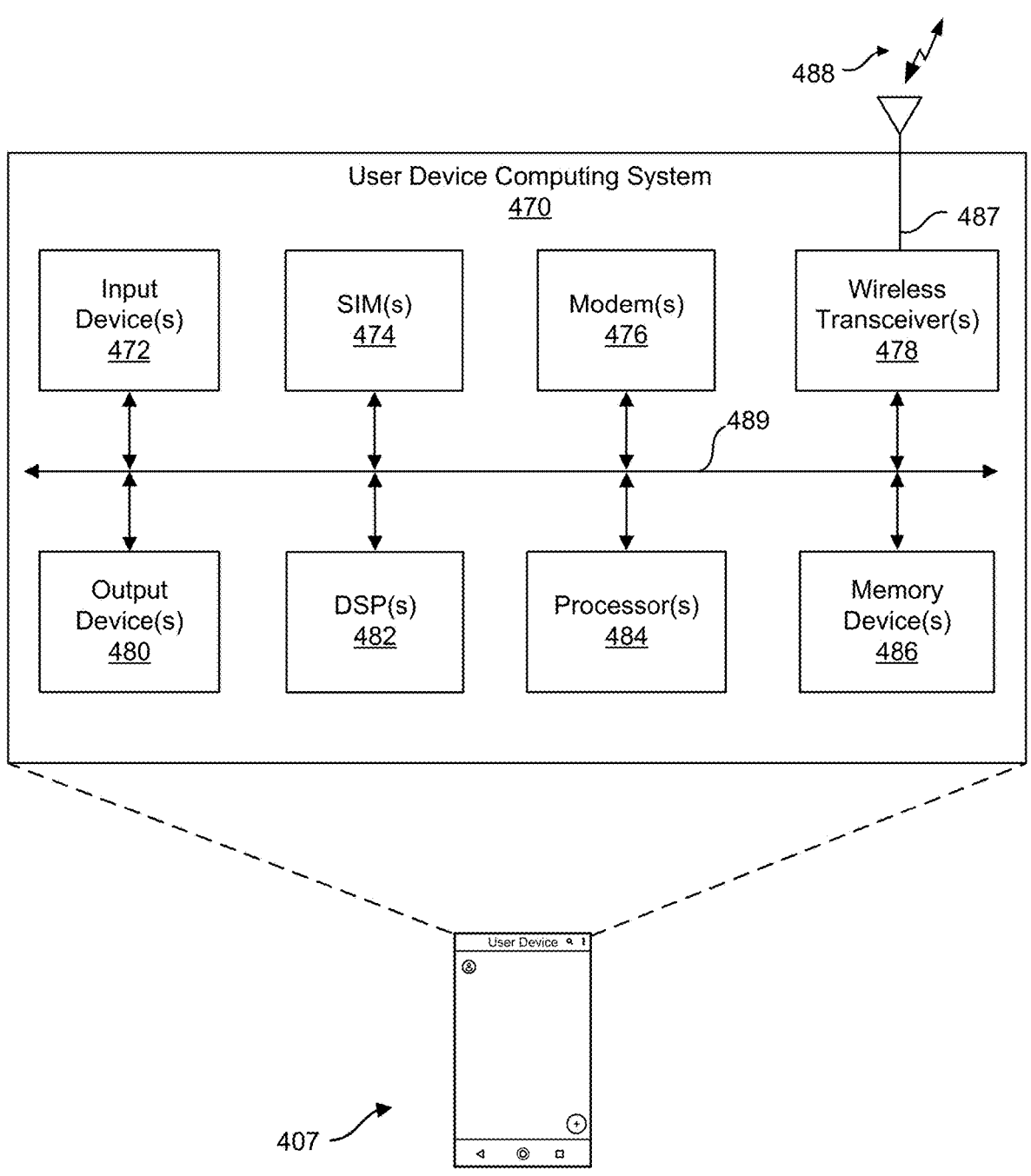
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5A:
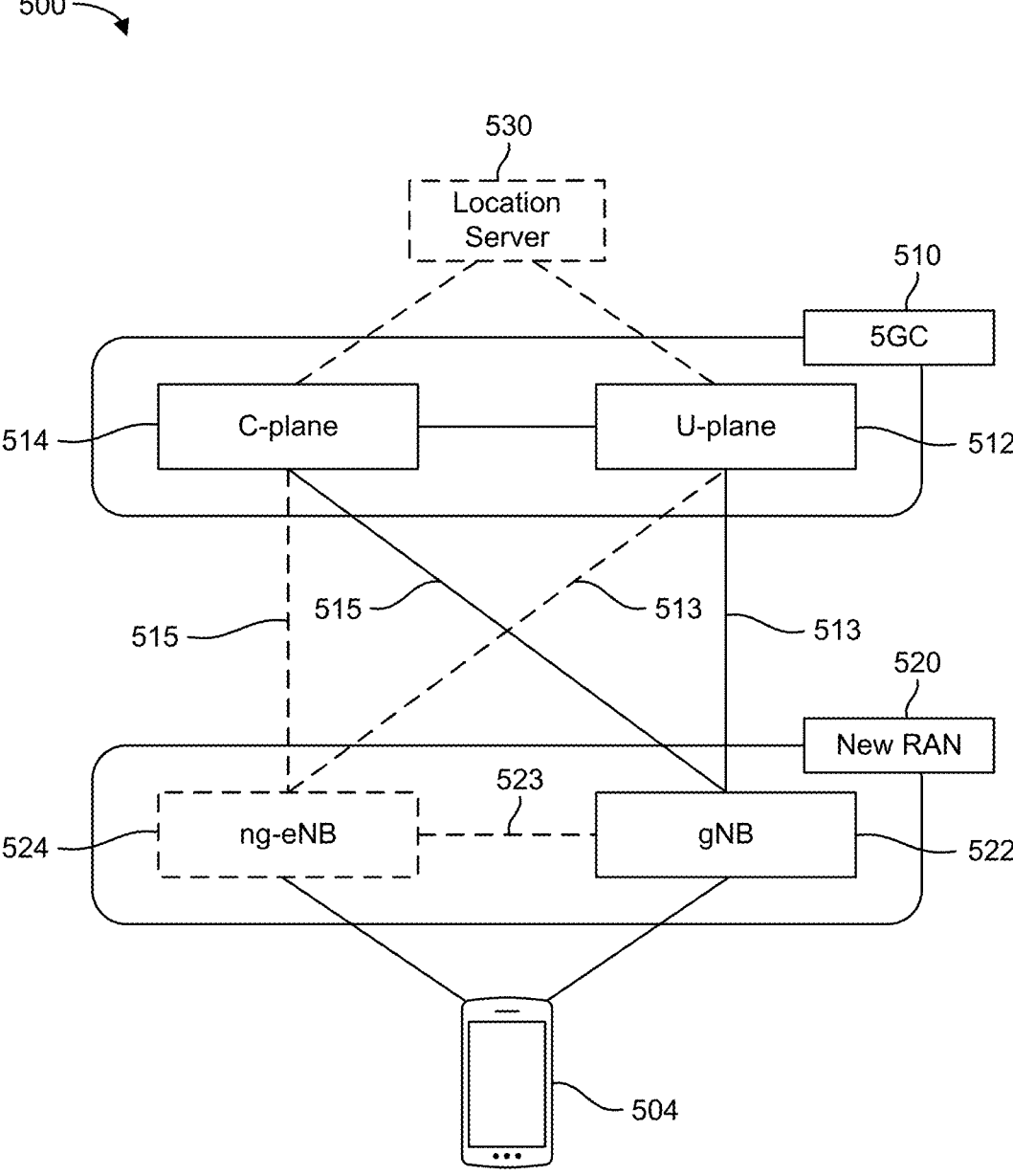
FIG. 5A and FIG. 5B illustrate examples of wireless network structures, in accordance with some examples.

According to various aspects, FIG. 5A illustrates an example wireless network structure 500. For example, a 5GC 510 (also referred to as a Next Generation Core (NGC)) may be viewed functionally as control plane functions 514 (e.g., UE registration, authentication, network access, gateway selection, etc.) and user plane functions 512, (e.g., UE gateway function, access to data networks, IP routing, etc.) which operate cooperatively to form the core network. User plane interface (NG-U) 513 and control plane interface (NG-C) 515 connect the gNB 522 to the 5GC 510 and specifically to the control plane functions 514 and user plane functions 512. In an additional configuration, an ng-eNB 524 may also be connected to the 5GC 510 via NG-C 515 to the control plane functions 514 and NG-U 513 to user plane functions 512. Further, ng-eNB 524 may directly communicate with gNB 522 via a backhaul connection 523. In some configurations, the New RAN 520 may only have one or more gNBs 522, while other configurations include one or more of both ng-eNBs 524 and gNBs 522. Either gNB 522 or ng-eNB 524 may communicate with UEs 504 (e.g., any of the UEs depicted in FIGS. 1-4, etc.).

In some aspects, wireless network structure 500 may include location server 530, which may be in communication with the 5GC 510 to provide location assistance for UEs 504. The location server 530 may be implemented as a plurality of separate servers (e.g., physically separate servers, different software modules on a single server, different software modules spread across multiple physical servers, etc.), or alternately may each correspond to a single server. The location server 530 may be configured to support one or more location services for UEs 504 that may connect to the location server 530 via the core network, 5GC 510, and/or via the Internet (not illustrated). Further, the location server 530 may be integrated into a component of the core network, or alternatively may be external to the core network. In some examples, the location server 530 may be operated by a carrier or provider of the 5GC 510, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 5B:

According to various aspects, FIG. 5B illustrates another example wireless network structure 550. In some examples, 5GC 560 may be viewed functionally as control plane functions, provided by an access and mobility management function (AMF) 564, and user plane functions, provided by a user plane function (UPF) 562, which operate cooperatively to form the core network (e.g., 5GC 560). User plane interface 563 and control plane interface 565 connect the ng-eNB 524 to the 5GC 560 and specifically to UPF 562 and AMF 564, respectively. In some examples, a gNB 522 may also be connected to the 5GC 560 via control plane interface 565 to AMF 564 and user plane interface 563 to UPF 562. Further, ng-eNB 524 may directly communicate with gNB 522 via the backhaul connection 523, with or without gNB direct connectivity to the 5GC 560. In some configurations, the New RAN 520 may only have one or more gNBs 522, while other configurations include one or more of both ng-eNBs 524 and gNBs 522. Either gNB 522 or ng-eNB 524 may communicate with UEs 504 (e.g., any of the UEs depicted in FIG. 1). The base stations of the New RAN 520 communicate with the AMF 564 over the N2 interface and with the UPF 562 over the N3 interface.

The functions of the AMF 564 may include registration management, connection management, reachability management, mobility management, lawful interception, transport for session management (SM) messages between the UE 504 and a session management function (SMF) 566, transparent proxy services for routing SM messages, access authentication and access authorization, transport for short message service (SMS) messages between the UE 504 and the short message service function (SMSF) (not shown), and security anchor functionality (SEAF). The AMF 564 may also interact with an authentication server function (AUSF) (not shown) and the UE 504, and may receive an intermediate key established as a result of the UE 504 authentication process.

In the case of authentication based on a UMTS (universal mobile telecommunications system) subscriber identity module (USIM), the AMF 564 may retrieve the security material from the AUSF. The functions of the AMF 564 may also include security context management (SCM). The SCM may receive a key from the SEAF that it may use to derive access-network specific keys. The functionality of the AMF 564 may also include location services management for regulatory services, transport for location services messages between the UE 504 and a location management function (LMF) 570 (which acts as a location server 530), transport for location services messages between the New RAN 520 and the LMF 570, evolved packet system (EPS) bearer identifier allocation for interworking with the EPS, and UE 504 mobility event notification. In addition, the AMF 564 may also support functionalities for non-3GPP access networks.

In some cases, UPF 562 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 562 may also support transfer of location services messages over a user plane between the UE 504 and a location server, such as a secure user plane location (SUPL) location platform (SLP), not shown in FIG. 5B.

In some examples, the functions of SMF 566 may include session management, UE Internet protocol (IP) address allocation and management, selection and control of user plane functions, configuration of traffic steering at the UPF 562 to route traffic to the proper destination, control of part of policy enforcement and QoS, and downlink data notification. The interface over which the SMF 566 communicates with the AMF 564 may be referred to as the N11 interface.

In some aspects, wireless network structure 550 may include an LMF 570, which may be in communication with the 5GC 560 to provide location assistance for UEs 504. The LMF 570 may be implemented as a plurality of separate servers (e.g., physically separate servers, different software modules on a single server, different software modules spread across multiple physical servers, etc.), or alternately may each correspond to a single server. The LMF 570 may be configured to support one or more location services for UEs 504 that may connect to the LMF 570 via the core network, 5GC 560, and/or via the Internet (not illustrated). The SLP may support similar functions to the LMF 570, but whereas the LMF 570 may communicate with the AMF 564, New RAN 520, and UEs 504 over a control plane (e.g., using interfaces and protocols intended to convey signaling messages and not voice or data), the SLP may communicate with UEs 504 and external clients (not shown in FIG. 5B) over a user plane (e.g., using protocols intended to carry voice and/or data like the transmission control protocol (TCP) and/or IP).

In some cases, LMF 570 and/or the SLP may be integrated with a base station, such as the gNB 522 and/or the ng-eNB 524. When integrated with the gNB 522 and/or the ng-eNB 524, the LMF 570 and/or the SLP may be referred to as a "location management component," or "LMC." As used herein, references to LMF 570 and SLP include both the case in which the LMF 570 and the SLP are components of the core network (e.g., 5GC 560) and the case in which the LMF 570 and the SLP are components of a base station.

As noted previously, systems, apparatuses, processes (also referred to as methods), and computer-readable media (collectively referred to as "systems and techniques") are described herein that can be used to perform vertical position estimation and/or floor level estimation of a wireless communication device, such as a UE or various other wireless communication devices configured for communication with one or more wireless APs (e.g., WiFi APs, BLE APs, UWB APs, etc.), one or more network entities (e.g., base stations, gNBs, eNBs, etc.), or combinations thereof.

In some aspects, the systems and techniques can be used to perform vertical positioning (e.g., such as floor level estimation) to determine or estimate the height of a UE or other wireless communication device. For example, vertical positioning of a UE within a building or other multi-level structure can be referred to as floor level positioning or floor level estimation. In some aspects, different floor level positions (e.g., different floor level estimates) can correspond to different ranges of vertical positions or heights.

For example, FIG. 6 is a diagram illustrating an example of vertical position estimation 600 based on signaling information and/or measurements between a UE 650 and a plurality of wireless APs (e.g., APs 621-1, 621-2, 622, 623, 624-1, 624-2, and/or 625, etc., some or all of which may be WiFi APs, BLE APs, and/or UWB APs, etc.). As noted above, vertical position estimation that is performed to determine the vertical height or position of a UE (e.g., UE) within a building or other multi-level structure can also be referred to as "floor level" estimation. For instance, vertical position estimation 600 can comprise a floor level estimation to localize the UE 650 to a particular floor of a plurality of floors within a multi-level structure 605.

In one illustrative example, the multi-level structure 605 includes a bottom floor (e.g., "Floor 1"), intermediate floors (e.g., "Floor 2," "Floor 3," "Floor 4"), and a top floor (e.g., "Floor 5"). A "floor" of the building or structure 605 may also be referred to interchangeably as a "level." Each level can correspond to a range of vertical positions or height values. For instance, in an example where the multi-level structure 605 includes five levels that are each 15 ft in height, Floor 1 may correspond to the vertical positions or height values from 0-15 ft, Floor 2 may correspond to values from 15-30 ft, Floor 3 may correspond to values from 30-45 ft, Floor 4 may correspond to values from 45-60 ft, Floor 5 may correspond to values from 60-75 ft, etc. In some aspects, a multi-level structure (e.g., structure 605) can include a plurality of levels, where each respective level has the same height. In some examples, a multi-level structure (e.g., structure 605) can include a plurality of levels associated with two or more different heights and/or other spatial dimensions per level.

Vertical positioning and floor level estimation can be used for various purposes, such as public safety, emergency services and/or emergency navigation, indoor navigation (e.g., within malls, hospitals, offices, residential buildings, etc., among various other multi-level structures), etc. Some techniques for vertical positioning and floor level estimation may utilize one or more positioning signals transmitted by a network entity (e.g., cellular base station, gNB, eNB, etc.) and received and/or measured by one or more UEs or other wireless communication devices. Cellular network positioning signals may be associated with relatively low accuracy vertical position or floor level estimates when utilized within an indoor environment such as a building or other multi-level structure (e.g., such as multi-level structure 605). For instance, the floors and walls of the building or multi-level structure can attenuate and/or otherwise interfere with the positioning signals transmitted by the network entity. In some examples, the floors and walls of a building or multi-level structure may also attenuate and/or interfere with positioning signals associated with a Global Navigation Satellite System (GNSS), such as GPS, GLONASS, Galileo, BeiDou, Quasi-Zenith Satellite System (QZSS), etc. There is a need for systems and techniques that can be used to more accurately perform vertical positioning and/or floor level estimation to determine the floor level corresponding to a UE within a multi-level environment (e.g., such as UE 650 within the multi-level structure 605).

In one illustrative example, the systems and techniques can be used to perform vertical positioning and floor level estimation for a UE based on beacons or other signals transmitted by a plurality of APs, and contextual vertical position or floor level information corresponding to the APs and/or respective beacon signals transmitted by the APs. For instance, the systems and techniques can be used to perform vertical positioning and floor level estimation for the UE 650 within the multi-level structure 605 of FIG. 6, based on a plurality of downlink received signal strength indicator (DL-RSSI) measurements determined by the UE 650 for a corresponding plurality of beacons transmitted by the plurality of APs 621-1, 621-2, 622, 623, 624-1, 624-2, and/or 625, etc., some or all of which may be WiFi APs, BLE APs, and/or UWB APs, etc.

In some aspects, the plurality of APs can be WiFi APs configured to periodically broadcast WiFi beacon frames. A WiFi beacon frame is a management frame that is transmitted (e.g., broadcast) periodically by a WiFi AP to indicate the presence of a wireless LAN and to synchronize the members of the service set. For example, a WiFi beacon frame (e.g., also referred to herein as a "beacon" or "beacon frame") can be indicative of information such as the Service Set Identifier (SSID), a timestamp, supported data rates, a frequency channel of the wireless network, among various other parameters associated with the wireless network. The information indicated by the beacon frame can be used by client devices to connect to and/or adjust to the settings of the wireless network, for instance during network discovery and connection establishment processes for the WiFi network associated with the plurality of WiFi APs. WiFi beacon frames may also be used to implement network timing, for example based on the beacon frames being indicative of a time synchronization function (TSF) for coordinating transmission times between devices on the wireless network.

In one illustrative example, the UE 650 can be configured to perform DL-RSSI measurements for one or more beacon frames that are transmitted by the plurality of APs of FIG. 6 (e.g., one or more beacon frames received by the UE 650). For instance, the UE 650 may perform DL-RSSI measurements for (e.g., determine a corresponding or measured DL-RSSI value for) the APs 621-1 and 621-2 on Floor 1, the AP 622 on Floor 2, the AP 623 on Floor 3, the APs 624-1 and 624-2 on Floor 4, and/or the AP 625 on Floor 5, etc. For instance, each respective AP of the plurality of APs (e.g., APs 621-1, 621-2, 622, 623, 624-1, 624-2, 625) may transmit (e.g., broadcast) its corresponding beacon frame at a different, staggered time from the beacon frames of the remaining APs of the plurality. In some examples, each respective AP of the plurality of APs can transmit its corresponding beacon frame at a different time within a particular periodic interval (e.g., periodic window of time, corresponding to the beacon interval parameter of the WiFi network). Based on the beacon interval and/or other beacon transmission information associated with each respective AP of the plurality of APs, the UE 650 can be configured to scan and switch between respective APs of the plurality of APs to perform the DL-RSSI measurements for the beacon frames.

In some aspects, the UE 650 can be configured to determine a DL-RSSI measurement value for each beacon frame that is received by the UE 650. In some examples, one or more of the APs can additionally be configured to perform DL-RSSI measurements for beacon frames transmitted by other APs included in the plurality of APs. For instance, a beacon frame transmitted by a first AP can be associated with a first DL-RSSI value measured for the beacon frame by the UE 650, and one or more additional DL-RSSI values measured for the beacon frame by a corresponding one or more additional APs.

For instance, the AP 621-1 may transmit a first beacon frame at a first time. The UE 650 receives the first beacon frame from AP 621-1 and measures a first DL-RSSI value. The AP 621-2 can also receive the first beacon frame from AP 621-1 and may measure a first additional DL-RSSI value. The AP 622 may also receive the first beacon frame from AP 621-1 and may measure a second additional DL-RSSI value, etc.

In one illustrative example, a respective AP of the plurality of APs (e.g., APs 621-1, 621-2, 622, 623, 624-1, 624-2, 625) can be configured to determine a DL-RSSI measurement value for one or more beacon frames that are received by the respective AP. When the respective AP subsequently transmits its own beacon frame, the respective AP can be configured to generate its beacon frame to be indicative of the DL-RSSI measurement values determined for the beacon frames received by the respective AP from other APs included in the same plurality of APs (e.g., included in the same WiFi network that corresponds to the plurality of APs, etc.). In some aspects, the beacon frame transmitted by an AP can be indicative of the DL-RSSI measurement value determined by the AP for each beacon frame that the AP received during the current beacon interval (e.g., each beacon frame received since the time that the AP transmitted its last or most recent beacon frame, etc.).

For example, the respective beacon frame transmitted by AP 621-1 may be indicative of the DL-RSSI measurement value determined by AP 621-1 for a beacon frame transmitted by AP 621-2 in the current beacon interval of AP 621-1, and a DL-RSSI measurement value determined by AP 621-1 for a beacon frame transmitted by AP 622 in the current beacon interval of AP 621-1. The respective beacon frame transmitted by AP 621-2 may be indicative of DL-RSSI measurement values determined by AP 621-2 for the beacon frames transmitted by APs 621-1 and 622 within the current beacon interval of AP 621-2. The respective beacon frame transmitted by AP 622 may be indicative of DL-RSSI measurement values determined by AP 622 for the beacon frames transmitted by APs 621-1 and 622-2 within the current beacon interval of AP 622, etc.

Based on DL-RSSI measurement information (e.g., DL-RSSI measurement values) corresponding to beacon frames transmitted by the plurality of APs (e.g., APs 621-1, 621-2, 622, 623, 624-1, 624-2, 625), the UE 650 can determine subsets of the plurality of APs that may be positioned on same and/or adjacent levels of the multi-level structure 605. For instance, the UE 650 can group the plurality of APs based on comparing the DL-RSSI values associated with each respective AP of the plurality of APs to one or more thresholds. APs for which the UE 650 measures the strongest DL-RSSI values (e.g., greater than or equal to a first, or maximum, threshold, etc.) may be positioned on the same level of the structure 605 as the UE 650, and APs for which the UE 650 measures the weakest DL-RSSI values (e.g., less than or equal to a second, or minimum, threshold, etc.) may be positioned on a different level of the structure 605. For instance, the UE 650 may utilize the respective DL-RSSI values associated with an AP of the plurality of APs to determine a relative floor level distance (e.g., separation, offset, etc.) between the UE 650 and the AP, based on the signal attenuation of the WiFi beacon frames transmitted by the APs being higher through the floors of the multi-level structure 605 than through the walls on the same level of the multi-level structure 605. Greater signal attenuation of the WiFi beacon frame transmitted by an AP can correspond to a lower DL-RSSI measured by the UE 650 for the WiFi beacon frame transmitted by the AP.

For instance, the UE 650 may measure the greatest DL-RSSI value for the beacon frame(s) transmitted by the AP 623, which is located on the same level (e.g., Floor 3) of the multi-level structure 605 as the UE 650. The UE 650 can group the AP 623 into a first group, corresponding to the greatest DL-RSSI. The UE 650 can group the APs 622, 624-1, and/or 624-2 into a second group having the next greatest DL-RSSI values, based on the APs 622, 624-1, and 624-2 being located on the adjacent Floor 2 or Floor 4 relative to the UE 650 position on Floor 3 of the multi-level structure 605. The UE 650 can group the APs 621-1, 621-2, and/or 625 into a third group having the lowest DL-RSSI values, based on the APs 621-1, 621-2, and 625 being located multiple floors away from the UE 650 position on Floor 3 of the multi-level structure 605.

In some aspects, the UE 650 can utilize the respective DL-RSSI values measured by an AP (e.g., as indicated in the respective beacon frame subsequently transmitted by the AP) to determine the different floor level groupings of the plurality of APs 621-1, 621-2, 622, 623, 624-1, 624-2, 625. For instance, APs positioned on the same floor of the structure 605 should measure the strongest DL-RSSI values for the beacon frames transmitted by the other APs positioned on the same floor of the structure 605, and relatively weaker DL-RSSI values for the beacon frames transmitted by the remaining APs positioned on different floors of the structure 605. In some examples, the UE 650 can utilize the DL-RSSI measurement values indicated by the beacon frames transmitted from the plurality of APs to validate the initial grouping information determined by the UE 650 based on the DL-RSSI measurement values determined by the UE 650. For instance, the respective APs within each group determined by the ULE 650 will have same or similar DL-RSSI measurement values, as determined by the UE 650 for the beacon frames received from the respective APs within the group. If the UE 650 grouping of the respective APs into the same group is correct (e.g., based on the respective APs being positioned on the same or adjacent floors of the structure 605), each respective AP included in the group should measure the strongest DL-RSSI values for the beacon frames transmitted by the other APs that are members of the same group.

In some aspects, the group information determined by the UE 650 for the plurality of APs (e.g., APs 621-1, 621-2, 622, 623, 624-1, 624-2, 625) can be used to determine a floor level estimate for the current position of the UE 650, based on combining the AP grouping information with contextual vertical position or floor level information corresponding to the plurality of APs. For instance, the contextual information may be indicative of a floor level associated with respective WiFi SSIDs that are broadcast by at least a portion of the plurality of APs.

In one illustrative example, the UE 650 can determine the respective WiFi SSID associated with the beacon frame received by the UE 650 from each AP of one or more APs included in the grouping of APs with the strongest DL-RSSI measurement values. In some aspects, the WiFi SSIDs that are broadcasted from the strongest subset of the plurality of APs can be mapped to directory information of the multi-level structure 605. For instance, the WiFi SSID name can be mapped to the names of businesses or other entities included in directory information associated with the multi-level structure 605. In some examples, the directory information can be indicative of the position or location of businesses or other entities within the multi-level structure (e.g., "Entity A, Floor 1", "Entity B, Floor 4", "Entity C, Floor 2", . . . , etc.).

In some aspects, the UE 650 can use the directory information associated with multi-level structure 605 to map the respective WiFi SSIDs that are broadcasted from the strongest subset (e.g., greatest DL-RSSI of beacon frames measured by the UE 650) of the plurality of APs to corresponding business or entity names, which are in turn associated with a particular floor level within the multi-level structure 605. In some cases, the floor level information of different businesses or entities within the multi-level structure 605 can be included in a location and/or address database that is separate from the directory information of multi-level structure 605. In some examples, the directory information of multi-level structure 605 can directly include the floor level information of the different businesses or entities within the multi-level structure 605. In one illustrative example, the floor level position of the UE 650 can be estimated to be the same as the floor level corresponding to the WiFi SSIDs broadcasted by the strongest subset of APs for which beacon frames are measured by the ULE 650.

In some aspects, the UE 650 can utilize contextual information obtained from a user of the UE 650. For instance, the ULE 650 can determine that the user has completed a purchase or transaction using a payment application running on the UE 650. Based on the recently completed transaction using the payment application, the ULE 650 can determine a business name and associated address where the transaction was performed. Based on the business name and/or associated address corresponding to the recent transaction using UE 650, the UE 650 can determine current floor level information of the UE 650.

Figure 7:
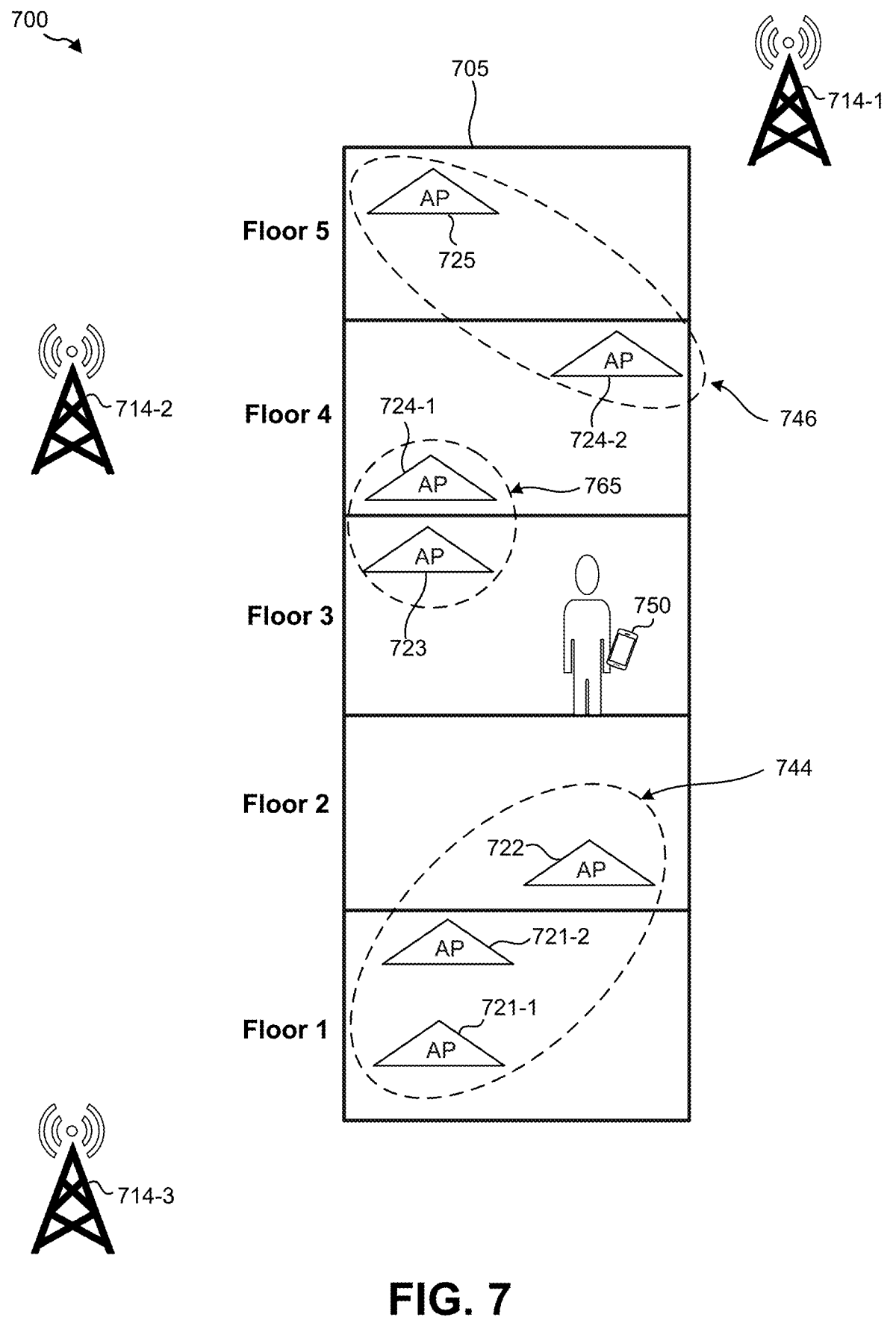

In one illustrative example, the systems and techniques can be used to determine a floor level position estimate for a UE without utilizing WiFi SSIDs, context information, and/or a location database mapping APs to floor levels of a multi-level structure. For instance, FIG. 7 is a diagram illustrating another example of vertical position estimation 700 based on signaling information and/or measurements between a UE and a plurality of wireless APs, in accordance with some examples. In some cases, a multi-level structure 705 can be the same as or similar to the multi-level structure 605 of FIG. 6. A UE 750 can be the same as or similar to the UE 650 of FIG. 7. The APs 721-1, 721-2, 722, 723, 724-1, 724-2, and 725 of FIG. 7 can be the same as or similar to (respectively) the APs 621-1, 621-2, 622, 623, 624-1, 624-2, and 625 of FIG. 6.

In some aspects, the UE 750 can determine an initial vertical position (e.g., z-coordinate) estimate corresponding to the current position of the UE 750. For instance, the UE 750 can be configured to determine an initial vertical position estimate based on one or more positioning signals received by the UE 750 from one or more network entities 714-1, 714-2, 714-3, etc. In some examples, the one or more network entities 714-1, 714-2, 714-3 may be cellular base station, gNBs, eNBs, etc. In some aspects, the UE 750 can determine an initial vertical position estimate based on one or more positioning signals received from a first network entity (e.g., a respective one of the network entities 714-1, 714-2, or 714-3, etc.). In some examples, the UE 750 can determine an initial vertical position estimate based on one or more positioning signals received by the UE 750 from multiple ones of the network entity (e.g., two or more of the network entities 714-1, 714-2, or 714-3, etc.). In some examples, the UE 750 can determine the initial vertical position estimate based on a barometer measurement determined using a barometer or pressure sensor included in and/or associated with the UE 750. For instance, a first pressure value can be calibrated to a reference vertical position (e.g., height, z-coordinate, etc.) for the UE 750. Based on obtaining a barometer or pressure value reading of a pressure that is less than the calibrated reference pressure value, the UE 750 may determine an initial vertical position estimate that is higher than the reference vertical position. Based on obtaining a barometer or pressure value reading of a pressure that is greater than the calibrated reference pressure value, the UE 750 may determine an initial vertical position estimate that is lower than the reference vertical position.

In some cases, the UE 750 can utilize the initial vertical position estimate to determine an initial floor level estimate. For instance, the UE 750 can divide the estimated initial vertical position by a configured floor height value, where the configured floor height value corresponds to the height (or estimated height) of each respective floor within the multi-level structure 705 within which the UE 750 is currently located. In some aspects, the configured floor height value can be an average floor height value that does not uniquely correspond to the multi-level structure 705 and/or the current horizontal position estimate of the UE 750. In some examples, the configured floor height value can be an average floor height value that corresponds to the multi-level structure 705 (e.g., 7.5 ft in examples where the multi-level structure 705 is a home or residential building, 10 ft in examples where the multi-level structure 705 is a business or commercial building, etc.). In some examples, the UE 750 can determine a current horizontal position estimate corresponding to the current location of the UE 750, and can map the horizontal position estimate to a map information database to determine the particular multi-level structure 705 in which the UE 750 is located, to determine a structure type (e.g., residential, commercial, etc.) of the particular multi-level structure 705, etc. Based on identifying the particular multi-level structure 705 and/or structure type thereof, the UE 750 can determine the configured floor height value to be used for converting the initial vertical position estimate for the UE 750 into an initial floor level position for the UE 750 within the multi-level structure 705.

In some aspects, the UE 750 can subsequently validate the initial floor level position estimate based on measured DL-RSSI values determined by the UE 750 for respective WiFi beacon frames transmitted by respective APs of the plurality of APs 721-2, 721-2, 723, 724-1, 724-2, and/or 725. For instance, the UE 750 can determine DL-RSSI measurement values for WiFi beacon frames from the plurality of APs, and may subsequently group the APs into subsets based on DL-RSSI strength, in a manner the same as or similar to that described above with respect to UE 650 of FIG. 6.

For instance, the UE 750 can utilize DL-RSSI measurement values corresponding to beacon frames transmitted by respective APs of the plurality of APs to determine a first group 765 that corresponds to the subset of APs with the strongest (e.g., largest) DL-RSSI values (e.g., measured by the UE 750 for the respective beacon frames of the APs within first group 765), and a second group 744 and a third group 746 that correspond to respective subsets of APs with weaker (e.g., smaller) DL-RSSI values measured for their respective beacon frames. In some aspects, the second group 744 and third group 746 can be combined into a single group that includes the subset of APs (e.g., of the plurality of APs of FIG. 7) with DL-RSSI values that are below one or more configured threshold values associated with the group 765 of the subset of APs with the strongest DL-RSSI values.

In some aspects, the UE 750 can utilize the grouping of the plurality of APs into the first group 765, second group 744, and third group 746 to validate and/or update the initial floor level estimate determine by the UE 750 (e.g., the initial floor level estimated determined using positioning signals from the network entities 714-1, 714-2, 714-3 and/or barometer readings of the UE 750, etc.).

For instance, based on an observation of a first group of strong DL-RSSI APs (e.g., the first group 765, including APs 723 and 724-1) and a single group of weaker DL-RSSI APs (e.g., group 744, including APs 721-1, 721-2, and 722; or group 746, including APs 724-2 and 725; etc.), the UE 750 can infer that the current floor level position of UE 750 is either on the first floor (e.g., "Floor 1") of the multi-level structure 705 or the topmost floor (e.g., "Floor 5") of the multi-level structure 705. The UE 750 can be configured to modify, update, and/or refine the initial floor level estimate if the UE 750 initial floor level estimate is different from the inferred floor level for the UE 750 determined based on the DL-RSSI grouping of the plurality of APs (e.g., groups 765, 744, 746).

In another illustrative example, if the UE 750 does not observe WiFi beacon frame DL-RSSI values corresponding to a single group of strong APs and a single group of weaker APs, the UE 750 can be configured to infer that the current floor level position of UE 750 is on an intermediate floor of the multi-level structure 705 (e.g., "Floor 2," "Floor 3," or "Floor 4") rather than on either the bottom floor (e.g., "Floor 1") or the topmost floor (e.g., "Floor 5"). For instance, if the UE 750 observes WiFi beacon frame DL-RSSI values corresponding to a group of strong APs (e.g., such as the group 765 of FIG. 7) and also observes WiFi beacon frame DL-RSSI values corresponding to two or more groups of weaker APs (e.g., such as the groups 744 and 746 of FIG. 7), the UE 750 can be configured to determine that the current floor level position of the UE 750 is on one of the intermediate floors of the multi-level structure 705. In some aspects, based on a determination that the current floor level position of the UE 750 is on an intermediate floor of multi-level structure 705, the UE 750 can be configured to retain the initial floor level estimate of the UE vertical position.

Figure 8:
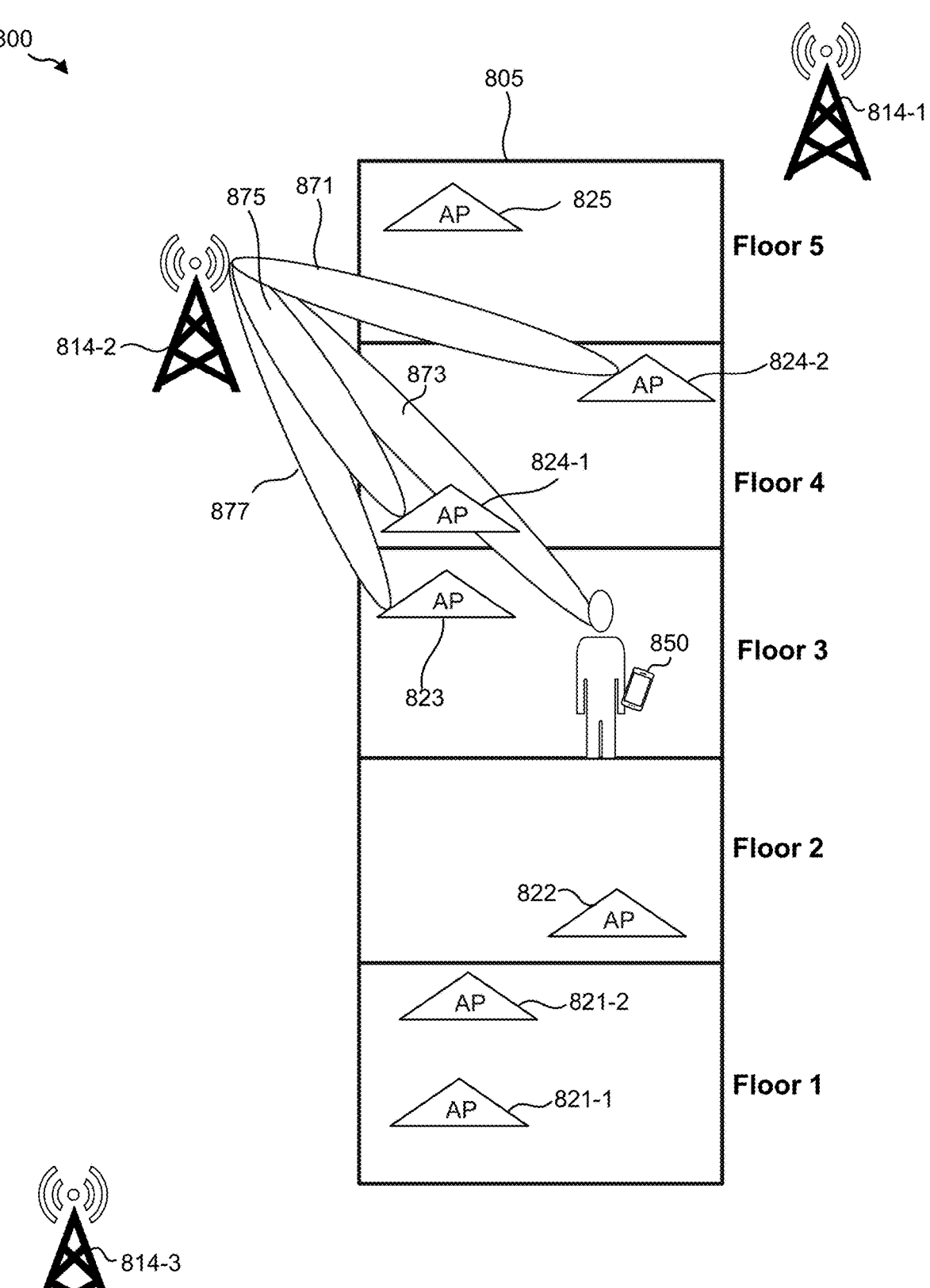
FIG. 8 is a diagram illustrating an example of vertical position estimation based on signaling information and/or measurements from one or more base stations to a plurality of wireless APs and a UE, in accordance with some examples.

FIG. 8 is a diagram illustrating an example of vertical position estimation 800 based on signaling information and/or measurements from one or more base stations to a plurality of wireless APs and a UE, in accordance with some examples. In some aspects, a multi-level structure 805 of FIG. 8 can be the same as or similar to one or more of the multi-level structure 605 of FIGS. 6 and/or 705 of FIG. 7. A UE 850 of FIG. 8 can be the same as or similar to one or more of the UE 650 of FIGS. 6 and/or 750 of FIG. 7. A plurality of APs can include AP 821-1, 821-2, 822, 823, 824-1, 824-2, and 825, which may be the same as or similar to one or more of: the APs 621-1, 621-2, 622, 623, 624-1, 624-2, and 625 (respectively) of FIG. 6; and/or the APs 721-1, 721-2, 722, 723, 724-1, 724-2, and 725 (respectively) of FIG. 7. The network entities 814-1, 814-2, and 814-3 of FIG. 8 can be the same as or similar to the network entities 714-1, 714-2, and 714-3 (respectively) of FIG. 7.

In some aspects, one or more (or all) of the respective APs included in the plurality of APs of FIG. 8 (e.g., APs 821-1, 821-2, 822, 823, 824-1, 824-2, and 825) can be configured with cellular connectivity capabilities. For instance, at least a portion of the plurality of APs of FIG. 8 can be configured for wireless communications with one or more of the network entities 814-1, 814-2, and/or 814-3, where the network entities 814-1, 814-2, 814-3 may be provided as cellular base station, gNBs, eNBs, etc. In some aspects, the plurality of APs of FIG. 8 can be configured for wireless communications with the network entities 814-1, 814-2, and/or 814-3 to implement wireless backhaul functionality for the plurality of APs.

In one illustrative example, at least a portion of the plurality of APs of FIG. 8 can be configured to perform positioning measurements with one or more of the network entities 814-1, 814-2, and/or 814-3, to determine respective initial position estimates for each AP of the portion of the plurality of APs configured for cellular communications. For instance, cellular positioning measurements can be performed between the network entities 814-1, 814-2, and/or 814-3 and the UE 850 and can additionally be performed between the network entities 814-1, 814-2, and/or 814-3 and at least a portion of the plurality of APs of FIG. 8.

For instance, the network entity 814-2 can transmit a plurality of reference beams 871, 873, 875, and 877 that can be used for positioning measurements by the UE 850 and respective APs within the multi-level structure 805. For instance, the reference beams 871, 873, 875, and/or 877 can be associated with and/or used to transmit one or more positioning signals. In some aspects, different APs may be located at different vertical height positions (e.g., different floor levels) and may receive different beams from the network entity 814-2. For instance, a first beam 871 can be received by the AP 824-2 positioned on Floor 4; a second beam 873 can be received by one or more (or both) of the AP 824-1 on Floor 4 and/or the UE 850 on Floor 3; a third beam 875 can be received by the AP 824-1 on Floor 4; and a fourth beam 877 can be received by the AP 823 on Floor 3; etc.

In one illustrative example, vertical position estimates can be determined by the UE 850 and/or the APs 824-2, 824-1, and 823 based on calculating one or more of a zenith angle of arrival (ZoA) and/or a zenith angle of departure (ZoD) corresponding to the respective beam(s) 871, 873, 875, 877 that are received by the UE 850 or AP 824-2, 824-1, 823.

In some aspects, a Location Management Function (LMF) associated with the network entities 814-1, 814-2, and/or 814-3 can be used to determine vertical position information corresponding to the UE 850 and/or corresponding to one or more NR-capable APs (e.g., APs 824-2, 824-1, and 823, etc.). In some aspects, the LMF can be the same as or similar to the LMF 570 of FIG. 5B and the UE 850 of FIG. 8 can be the same as or similar to the UE 504 of FIG. 5B (e.g., and the network entities 814-1, 814-2, and 814-3 of FIG. 8 can be the same as or similar to one or more of the ng-eNB 524 and/or gNB 522 of the new RAN 520 of FIG. 5B, etc.).

In some cases, the LMF associated with the network entity 814-2 and used to determine the ZoA, ZoD, and/or vertical position information for the UE 850 and cellular-capable APs 824-2, 824-1, 823 of FIG. 8 can be the same as or similar to the location server 530 of FIG. 5A, and the UE 850 of FIG. 8 can be the same as or similar to the UE 504 of FIG. 5A. In some aspects, the network entities 814-1, 814-2, and 814-3 of FIG. 8 can be the same as or similar to one or more of the ng-eNB 524 and/or gNB 522 of the new RAN 520 of FIG. 5A, etc.).

For instance, the LMF 570 of FIG. 5B can be used to analyze one or more measurements that are made between the network entity 814-2 of FIG. 8 and the UE 850 and the plurality of APs of FIG. 8. In some aspects, the LMF associated with network entity 814-2 can be used to determine the ZoA and/or ZoD between the respective beam from the network entity 814-2 and the UE 850 or AP 824-2, 824-1, or 823.

In some aspects, the LMF associated with network entity 814-2 can transmit to the UE 850 information indicative of the respective initial vertical position associated with each AP of the plurality of APs of FIG. 8. In some examples, the LMF associated with the network entity 814-2 can transmit the corresponding initial vertical position determined for each respective AP of the plurality of APs to the respective AP, and the respective AP can transmit its initial vertical position information to the UE 850.

In one illustrative example, the plurality of APs (e.g., AP 821-1, 821-2, 822, 823, 824-1, 824-2, and 825) can be categorized into different floor levels (e.g., Floors 1-5 of the multi-level structure 805, etc.) based on the vertical position information corresponding to each respective AP of the plurality of APs and/or based on the respective ZoA and ZoD information corresponding to each respective AP of the plurality of APs of FIG. 8. In some aspects, the LMF associated with network entity 814-2 can determine the categorization of the plurality of APs into the different floor levels, and can transmit to the UE 850 information indicative of the floor level categorizations for the plurality of APs.

In one illustrative example, the floor level information determined for each respective AP of the plurality of APs of FIG. 8 based on ZoA and/or ZoD information using the network entity 814-2 can be subsequently used to validate an initial floor level estimate of the current position of the UE 850. For instance, the floor level categorization or classification of the plurality of APs (e.g., determined by the network entity 814-2 and/or LMF associated with the network entity 814-2, etc.) can be used by the UE 850 to validate, update, modify, and/or refine an initial floor level estimate of the ULE 850 (e.g., such as an initial UE floor level estimate based on positioning measurements between network entity 814-2 and UE 850 and/or based on barometer or pressure measurements obtained by the UE 850, etc.). In another example, the UE 850 can identify a subset of the plurality of APs of FIG. 8 for which the UE 850 measures the strongest (e.g., largest) WiFi beacon frame DL-RSSI values (e.g., the same as or similar to the DL-RSSI measurements and AP grouping described with respect to UE 650 of FIG. 6 and/or UE 750 of FIG. 7). In some aspects, the UE 850 can identify the subset of the plurality of APs with the strongest beacon frame DL-RSSI measurement values, and can estimate its own floor level position (e.g., can estimate the floor level of the UE 850 current position within multi-level structure 805) to be the same as the estimated floor level of the respective APs with the strongest DL-RSSI beacon frame measurement values (e.g., determined by and transmitted from the LMF associated with network entity 814-2 to the UE 850). In some examples, a same-level subset of respective APs of the plurality of APs of FIG. 8 can be identified as being on the same floor level of structure 805 as the initial floor level estimate of UE 850. For instance, the same-level subset of APs can be identified by the network entity 814-2 and/or an LMF associated with network entity 814-2, and may be relayed to the UE 850. In some cases, the same-level subset of APs can be identified by the UE 850, based on respective WiFi beacon frame DL-RSSI measurement values associated with the APs. In some aspects, based on the identification of the respective APs included in the same-level subset as the UE 850 initial floor level estimate, the corresponding WiFi SSIDs of the APs in the same-level subset and/or other contextual information (e.g., a business or entity name from recent transaction information from a mobile payment application running on UE 850, etc.) can be used by the UE 850 to validate or refine its initial estimate of the current floor level position of the UE 850 within the multi-level structure 805.

Figure 9:
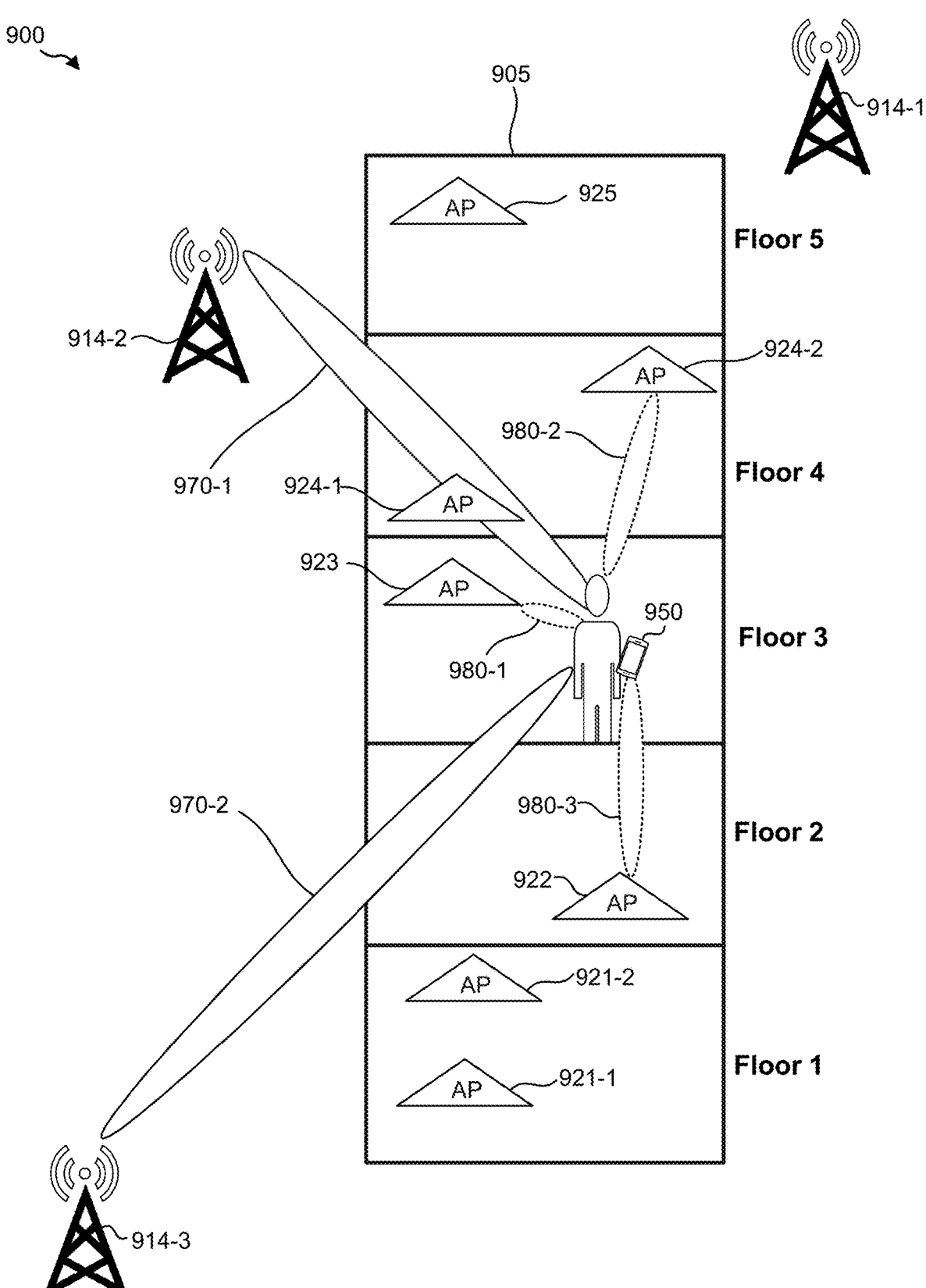
FIG. 9 is a diagram illustrating an example of vertical position estimation based on signaling information and/or measurements from one or more base stations to a UE and signaling information and/or measurements between the UE and a plurality of wireless APs, in accordance with some examples.

In some cases, the plurality of APs may be configured without cellular connectivity. For instance, FIG. 9 is a diagram illustrating an example of vertical position estimation 900 based on signaling information and/or measurements from one or more base stations to a UE and signaling information and/or measurements between the UE and a plurality of wireless APs, in accordance with some examples. In some cases, a multi-level structure 905 of FIG. 9 can be the same as or similar to one or more of the multi-level structure 605 of FIG. 6, 705 of FIG. 7, and/or 805 of FIG. 8. A UE 950 of FIG. 9 can be the same as or similar to one or more of the UE 650 of FIG. 6, 750 of FIG. 7, and/or 850 of FIG. 8. Network entities 914-1, 914-2, and 914-3 of FIG. 9 can be the same as or similar to the network entities 714-1, 714-2, and 714-3 of FIG. 7 (respectively) and/or the network entities 814-1, 814-2, and 814-3 of FIG. 8 (respectively). A plurality of APs can include the APs 921-1, 921-2, 922, 923, 924-1, 924-2, and 925, which may be the same as or similar to the APs 621-1, 621-2, 622, 623, 624-1, 624-2, and 625 of FIG. 6 (respectively), the APs 721-1, 721-2, 722, 723, 724-1, 724-2, and 725 of FIG. 7 (respectively), and/or the APs 821-1, 821-2, 822, 823, 824-1, 824-2, and 825 of FIG. 8 (respectively).

In some cases, the plurality of APs (e.g., the APs 921-1, 921-2, 922, 923, 924-1, 924-2, and 925) may be configured without cellular connectivity or NR capability, but may be associated with a location information database that includes corresponding AP location information for each respective AP of the plurality of APs. In some aspects, each AP of the plurality of APs can be associated with a location information database that includes crowdsourced location information corresponding to each respective AP of the plurality of APs. In some cases, the crowd-sourced AP location information may be inaccurate for at least the vertical (e.g., height and/or floor level position) estimate component thereof. In one illustrative example, the UE 950 of FIG. 9 can be the same as the UE 750 of FIG. 7, and can be configured to determine an initial vertical position estimate (e.g., based on positioning measurement between the UE 950 and one or more of the network entities 914-1, 914-2, and/or 914-3; based on barometer or pressure sensor readings of the UE 950; etc.) and subsequently to determine an initial floor level estimate based on dividing the initial vertical position estimate by a configured average floor height value (e.g., the same as or similar to the initial floor level estimate determined by UE 750 of FIG. 7).

For example, the UE 950 can determine an initial floor level estimate for the current position of UE 950 within multi-level structure 905 based on one or more signals transmitted between UE 950 and the network entity 914-2 (e.g., beam 970-1), between UE 950 and network entity 914-3 (e.g., beam 970-2), between UE 950 and AP 922 (e.g., signal 980-3), between UE 950 and AP 923 (e.g., signal 980-1), and/or between UE 950 and AP 924-2 (e.g., signal 980-2). In some aspects, the UE 950 can validate the initial floor level estimate based on identifying groups of APs associated with WiFi beacon frame DL-RSSI values of a similar measured strength at the UE 950. For instance, the APs 922, 923, and/or 924-2 may be associated with similar beacon frame DL-RSSI values as measured by the UE 950, and the APs 922, 923, and 924-2 can be categorized by UE 950 as being included in a group of APs with the strongest DL-RSSI measurement values.

In another example, the UE 950 can utilize positioning measurements between UE 950 and the plurality of APs to determine a same-level subset of APs that are positioned on the same or adjacent floor level of structure 905 as the initial floor level estimate for the UE 950. For instance, the UE-AP positioning measurements used to determine the same-level subset of APs can be based on the signals 980-1 (e.g., from AP 923 on Floor 3 to UE 950 on Floor 3), 980-2 (e.g., from AP 924-2 on Floor 4 to UE 950 on Floor 3), and 980-3 (e.g., from AP 922 on Floor 2 to UE 950 on Floor 3). The positioning measurements based on signals 980-1, 980-2, and 980-3 can be different from positioning measurements based on the DL-RSSI of beacon frames transmitted by the APs 922, 923, 924-2 and received by the UE 950.

In both examples, a floor level can be determined for the same-level subset of APs identified by UE 950 based on positioning measurements between the UE 950 and the APs and/or for the strongest DL-RSSI subset of APs identified by UE 950 based on WiFi beacon frames received by the UE 950. For instance, the floor level can be determined from corresponding vertical position information (e.g., height or z-coordinate) associated with the respective APs of the same-level subset or strongest DL-RSSI subset, where the corresponding vertical position information is obtained from a location database corresponding to the respective locations of each AP of the plurality of APs (e.g., crowd-sourced AP location database, etc.). The floor level determined from the corresponding vertical position information for the same-level subset of APs or for the strongest Dl-RSSI subset of APs can be used as the floor level estimate for the current position of UE 950 within the multi-level structure 905 of FIG. 9.

FIG. 10 is a flowchart diagram illustrating an example of a process 1000 for wireless communication. The process 1000 may be performed by a network entity or network device (or apparatus) or a component (e.g., a chipset, codec, etc.) of the network entity or device. The network entity may be a UE (e.g., the UE 104 of FIG. 1, FIG. 2, and/or FIG. 3, the wireless device 407 of FIG. 4, the UE 504 of FIG. 5A and/or FIG. 5B, etc., the UE 650 of FIG. 6, the UE 750 of FIG. 7, the UE 850 of FIG. 8, the UE 950 of FIG. 9, or other UE). The network entity (e.g., UE) can be a mobile device (e.g., a mobile phone), a network-connected wearable such as a watch, an extended reality (XR) device (e.g., a virtual reality (VR) device or augmented reality (AR) device), a vehicle or component or system of a vehicle, or other type of computing device configured to perform wireless communications. The operations of the process 1000 may be implemented as software components that are executed and run on one or more processors (e.g., the transmit processor 264, the receive processor 258, the TX MIMO processor 266, the MIMO detector 256 of FIG. 2, the processor(s) 484 of FIG. 4, the processor 1110 of FIG. 11, or other processor(s)). Further, the transmission and reception of signals by the network entity in the process 1000 may be enabled, for example, by one or more antennas, one or more transceivers (e.g., wireless transceiver(s)), and/or other communication components (e.g., the transmit processor 264, the receive processor 258, the TX MIMO processor 266, the MIMO detector 256, the modulator(s)/demodulator(s) 254a through 254t, and/or the antenna(es) 252a through 252t of FIG. 2, the antenna(es) 487 of FIG. 4, the wireless transceiver(s) 478 of FIG. 4, the communication interface 1140 of FIG. 11, or other antennae(s), transceiver(s), and/or component(s)).

At block 1002, the process 1000 can include the UE (or component, system, or apparatus thereof) determining, based on an estimated vertical position of the UE and a configured average floor height value, a floor level estimate corresponding to the UE. For instance, one or more of the estimated vertical position of the UE and/or the floor level estimate corresponding to the UE can be determined based on a location server, such as the location server 530 of FIG. 5A, the LMF 570 of FIG. 5B, etc. In some cases, the floor level estimate corresponding to the UE can be indicative of a particular floor level of a plurality of floor levels. For instance, the floor level estimate can be indicative of a particular floor level of a plurality of floor levels the same as or similar to the plurality of floor levels 'Floor 1'-'Floor 5' of FIGS. 6, 7, 8, and/or 9, etc.

In some examples, the configured average floor height value can be based on a horizontal position estimate corresponding to the UE. For instance, the configured average floor height value can be determined based on obtaining an average floor height value associated with a particular multi-level structure corresponding to the horizontal position estimate. In some case, the multi-level structure can be the same as or similar to the multi-level structure 605 of FIG. 6, 705 of FIG. 7, 805 of FIG. 8, 905 of FIG. 9, etc. In some cases, the configured average floor height value can be determined based on obtaining an average floor height value associated with a particular multi-level structure type corresponding to the horizontal position estimate.

In some examples, the estimated vertical position of the UE can be determined based on one or more positioning signals received from a base station associated with the UE. In some cases, the base station can be a cellular base station, gNB, etc., the same as or similar to one or more of the base stations 714-1, 714-2, and/or 714-3 of FIG. 7; the base stations 814-1, 814-2, and/or 814-3 of FIG. 8; the base stations 914-1, 914-2, and/or 914-3 of FIG. 9, etc. In some cases, the one or more positioning signals can be associated with, the same as, or similar to one or more of the beams or information carried thereon 871, 873, 875, and/or 877 of FIG. 8; beams 970-1, 970-2, 980-2, etc., of FIG. 9; etc.

In some cases, the process can include receiving estimated vertical position information corresponding to the plurality of APs, wherein the estimated vertical position information is based on respective positioning measurement signals between the base station and respective APs of the plurality of APs. For instance, the plurality of APs can be the same as or similar to one or more of the APs of any of FIGS. 6-9. In some examples, the respective positioning measurement signals can be the same as or similar to one or more of the respective positioning measurement signals between the APs and UE 650 of FIG. 6, the APs and UE 750 of FIG. 7, the APs and UE 850 of FIG. 8, the APs and UE 950 of FIG. 9, etc.

In some examples, the estimated vertical position information is based on one or more of zenith angle of arrival (ZoA) information or zenith angle of departure (ZoD) information corresponding to the respective positioning measurements signals between the base station and the respective APs of the plurality of APs. For example, in some cases, the estimated vertical position information corresponding to the plurality of APs can be received from a Location Management Function (LMF) associated with the base station. In some cases, the LMF can be the same as or similar to the LMF 570 of FIG. 5B.

In some examples, the estimated vertical position information is indicative of a respective floor level of a plurality of floor levels corresponding to a vertical position estimate for each respective AP of the plurality of APs. In some instances, the estimated vertical position of the UE can be determined based on one or more pressure measurements obtained using a pressure sensor included in the UE.

At block 1004, the process 1000 can include the UE (or component, system, or apparatus thereof) determining a downlink Received Signal Strength Indicator (DL-RSSI) value associated with a respective beacon frame received by the UE from each access point (AP) of a plurality of APs. In some case, each AP of the plurality of APs is positioned on a respective floor level of a plurality of floor levels. In some examples, each respective beacon frame is a WiFi beacon frame, and each AP of the plurality of APs is a WiFi AP. In some cases, each beacon frame is indicative of one or more additional DL-RSSI measurement values determined by a respective AP of the plurality of APs and corresponding to one or more beacon frames associated with different APs of the plurality of APs.

At block 1006, the process 1000 can include the UE (or component, system, or apparatus thereof) grouping the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold. For instance, the first AP group can be the same as or similar to the AP group 765 of FIG. 7, and the second AP group can be the same as or similar to the AP group 746 and/or the AP group 744 of FIG. 7, etc.

In some examples, grouping the plurality of APs based on the DL-RSSI values comprises identifying the first AP group based on a determination that the first subset of the plurality of APs is associated with relatively strong DL-RSSI values measured by the UE. For instance, the first AP group 765 of FIG. 7 can include the first subset of APs 724-1, 724-2 associated with relatively strong DL-RSSI values measured by UE 750 of FIG. 7. In some cases, the second AP group can be identified based on a determination that the second subset of the plurality of APs is associated with relatively weak DL-RSSI values measured by the UE. For instance, the second AP group 744 of FIG. 7 can include the second subset of APs 722, 721-2, 721-1 associated with relatively weak DL-RSSI values measured by the UE 750 of FIG. 7, etc. In some examples, at least a portion of the first subset of the plurality of APs are positioned on the particular floor level. In some cases, the first subset comprises respective APs associated with a strongest set of DL-RSSI values measured by the UE for the plurality of APs.

At block 1008, the process 1000 can include the ULE (or component, system, or apparatus thereof) validating the floor level estimate corresponding to the UE based on a comparison between the floor level estimate and respective floor level information associated with the first AP group. In some examples, validating the floor level estimate is based on determining the floor level estimate is different from the respective floor level information, and generating an updated floor level estimate corresponding to the UE, wherein the updated floor level estimate is based on the respective floor level information. In some cases, the updated floor level estimate is the same as the respective floor level information associated with each AP of the first subset of the plurality of APs.

In some examples, validating the floor level estimate comprises determining that each AP of the plurality of APs is included in the first AP group or the second AP group, and validating the floor level estimate based on a determination the floor level estimate is indicative of an uppermost floor level of a plurality of floor levels or a bottom floor level of the plurality of floor levels. In another example, based on a determination the floor level estimate is not indicative of the uppermost floor level or the bottom floor level, validating the floor level estimate comprises updating the floor level estimate to be indicative of one of the uppermost floor level or the bottom floor level.

In some cases, validating the floor level estimate comprises identifying a third AP group including a third subset of the plurality of APs, wherein each AP of the third subset is associated with a respective DL-RSSI value less than the threshold and different from the respective DL-RSSI values associated with the second subset. In some examples, the process 1000 includes validating the floor level estimate based on a determination the floor level estimate is not indicative of an uppermost floor level of a plurality of floor levels or a bottom floor level of the plurality of floor levels.

In some examples, validating the floor level estimate corresponding to the UE includes obtaining location information for each respective AP of the first subset, wherein the location information includes a respective vertical position associated with each respective AP of the first subset. A floor level estimate corresponding to the respective vertical positions associated with the first subset can be determined and the floor level estimate corresponding to the UE can be compared to the floor level estimate corresponding to the respective vertical positions associated with the first subset.

In some cases, the location information for each respective AP of the first subset is crowd-sourced location information.

The wireless communication device (e.g., UE) may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 1000 of FIG. 10 and/or other processed described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 of FIG. 10 and/or other processes described herein may be illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 of FIG. 10 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
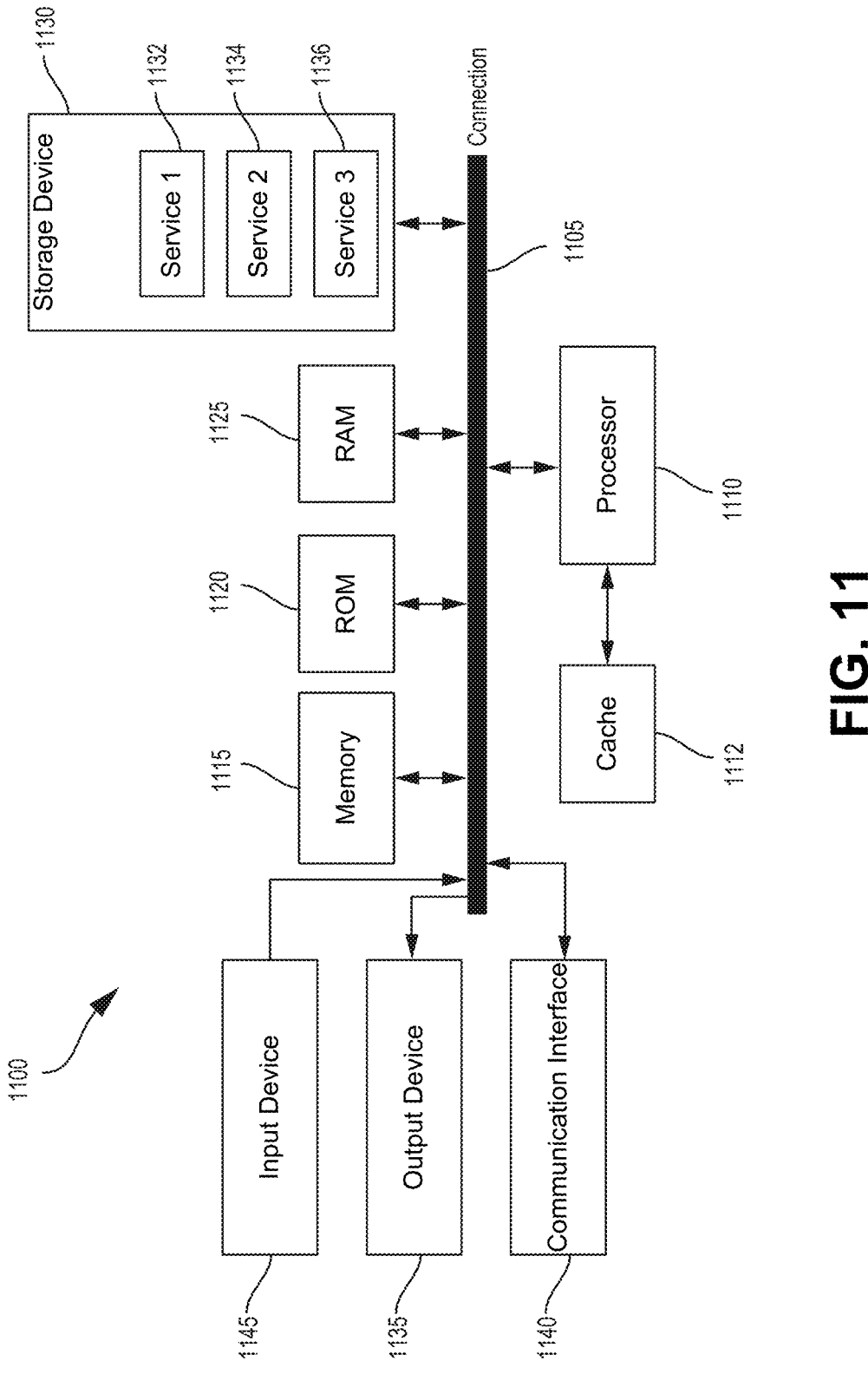
FIG. 11 illustrates an example computing system, in accordance with some examples.

FIG. 11 is a block diagram illustrating an example of a computing system 1100, which may be employed by the disclosed systems and techniques for enhanced zone configuration indication for V2X groupcast messages. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus of a user equipment (UE) for wireless communications, comprising: at least one memory; and at least one processor coupled to the at least one memory, wherein the at least one processor is configured to: determine, based on an estimated vertical position of the UE and a configured average floor height value, a floor level estimate corresponding to the UE; determine a downlink Received Signal Strength Indicator (DL-RSSI) value associated with a respective beacon frame received by the UE from each access point (AP) of a plurality of APs; group the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validate the floor level estimate corresponding to the UE based on a comparison between the floor level estimate and respective floor level information associated with the first AP group.

Aspect 2. The apparatus of Aspect 1, wherein: each AP of the plurality of APs is positioned on a respective floor level of a plurality of floor levels; the floor level estimate corresponding to the UE is indicative of a particular floor level of the plurality of floor levels; and at least a portion of the first subset of the plurality of APs are positioned on the particular floor level.

Aspect 3. The apparatus of any of Aspects 1 to 2, wherein, to validate the floor level estimate, the at least one processor is configured to: determine the floor level estimate is different from the respective floor level information; and generate an updated floor level estimate corresponding to the UE, wherein the updated floor level estimate is based on the respective floor level information.

Aspect 4. The apparatus of Aspect 3, wherein the updated floor level estimate is the same as the respective floor level information associated with each AP of the first subset of the plurality of APs.

Aspect 5. The apparatus of any of Aspects 1 to 4, wherein the first subset comprises respective APs associated with a strongest set of DL-RSSI values measured by the UE for the plurality of APs.

Aspect 6. The apparatus of any of Aspects 1 to 5, wherein the at least one processor is configured to determine the configured average floor height value based on a horizontal position estimate corresponding to the UE.

Aspect 7. The apparatus of Aspect 6, wherein, to determine the configured average floor height value, the at least one processor is configured to: obtain an average floor height value associated with a particular multi-level structure corresponding to the horizontal position estimate.

Aspect 8. The apparatus of any of Aspects 6 to 7, wherein, to determine the configured average floor height value, the at least one processor is configured to: obtain an average floor height value associated with a particular multi-level structure type corresponding to the horizontal position estimate.

Aspect 9. The apparatus of any of Aspects 1 to 8, wherein, to group the plurality of APs based on the DL-RSSI values, the at least one processor is configured to: identify the first AP group based on a determination that the first subset of the plurality of APs is associated with relatively strong DL-RSSI values measured by the UE; and identify the second AP group based on a determination that the second subset of the plurality of APs is associated with relatively weak DL-RSSI values measured by the UE.

Aspect 10. The apparatus of Aspect 9, wherein, to validate the floor level estimate, the at least one processor is configured to: determine that each AP of the plurality of APs is included in the first AP group or the second AP group; and validate the floor level estimate based on a determination the floor level estimate is indicative of an uppermost floor level of a plurality of floor levels or a bottom floor level of the plurality of floor levels; or based on a determination the floor level estimate is not indicative of the uppermost floor level or the bottom floor level, update the floor level estimate to be indicative of one of the uppermost floor level or the bottom floor level.

Aspect 11. The apparatus of any of Aspects 9 to 10, wherein, to validate the floor level estimate, the at least one processor is configured to: identify a third AP group including a third subset of the plurality of APs, wherein each AP of the third subset is associated with a respective DL-RSSI value less than the threshold and different from the respective DL-RSSI values associated with the second subset; and validate the floor level estimate based on a determination the floor level estimate is not indicative of an uppermost floor level of a plurality of floor levels or a bottom floor level of the plurality of floor levels.

Aspect 12. The apparatus of any of Aspects 1 to 11, wherein the at least one processor is configured to determine the estimated vertical position of the UE based on one or more positioning signals received from a base station associated with the UE.

Aspect 13. The apparatus of Aspect 12, wherein the at least one processor is further configured to: receive estimated vertical position information corresponding to the plurality of APs, wherein the estimated vertical position information is based on respective positioning measurement signals between the base station and respective APs of the plurality of APs.

Aspect 14. The apparatus of Aspect 13, wherein the estimated vertical position information is based on one or more of zenith angle of arrival (ZoA) information or zenith angle of departure (ZoD) information corresponding to the respective positioning measurements signals between the base station and the respective APs of the plurality of APs.

Aspect 15. The apparatus of any of Aspects 13 to 14, wherein the at least one processor is configured to receive the estimated vertical position information corresponding to the plurality of APs from a Location Management Function (LMF) associated with the base station.

Aspect 16. The apparatus of Aspect 15, wherein the estimated vertical position information is indicative of a respective floor level of a plurality of floor levels corresponding to a vertical position estimate for each respective AP of the plurality of APs.

Aspect 17. The apparatus of any of Aspects 1 to 16, wherein, to validate the floor level estimate corresponding to the UE, the at least one processor is configured to: obtain location information for each respective AP of the first subset, wherein the location information includes a respective vertical position associated with each respective AP of the first subset; determine a floor level estimate corresponding to the respective vertical positions associated with the first subset; and compare the floor level estimate corresponding to the UE to the floor level estimate corresponding to the respective vertical positions associated with the first subset.

Aspect 18. The apparatus of Aspect 17, wherein the location information for each respective AP of the first subset is crowd-sourced location information.

Aspect 19. The apparatus of any of Aspects 1 to 18, wherein the at least one processor is configured to determine the estimated vertical position of the UE based on one or more pressure measurements obtained using a pressure sensor included in the UE.

Aspect 20. The apparatus of any of Aspects 1 to 19, wherein each respective beacon frame is a WiFi beacon frame, and wherein each AP of the plurality of APs is a WiFi AP.

Aspect 21. The apparatus of any of Aspects 1 to 20, wherein each beacon frame is indicative of one or more additional DL-RSSI measurement values determined by a respective AP of the plurality of APs and corresponding to one or more beacon frames associated with different APs of the plurality of APs.

Aspect 22. A method for wireless communications by a user equipment (UE), comprising: determining, based on an estimated vertical position of the UE and a configured average floor height value, a floor level estimate corresponding to the UE; determining a downlink Received Signal Strength Indicator (DL-RSSI) value associated with a respective beacon frame received by the UE from each access point (AP) of a plurality of APs; grouping the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validating the floor level estimate corresponding to the UE based on a comparison between the floor level estimate and respective floor level information associated with the first AP group.

Aspect 23. The method of Aspect 22, wherein: each AP of the plurality of APs is positioned on a respective floor level of a plurality of floor levels; the floor level estimate corresponding to the UE is indicative of a particular floor level of the plurality of floor levels; and at least a portion of the first subset of the plurality of APs are positioned on the particular floor level.

Aspect 24. The method of any of Aspects 22 to 23, wherein validating the floor level estimate comprises: determining the floor level estimate is different from the respective floor level information; and generating an updated floor level estimate corresponding to the UE, wherein the updated floor level estimate is based on the respective floor level information.

Aspect 25. The method of Aspect 24, wherein the updated floor level estimate is the same as the respective floor level information associated with each AP of the first subset of the plurality of APs.

Aspect 26. The method of any of Aspects 22 to 25, wherein the first subset comprises respective APs associated with a strongest set of DL-RSSI values measured by the UE for the plurality of APs.

Aspect 27. The method of any of Aspects 22 to 26, wherein the configured average floor height value is determined based on a horizontal position estimate corresponding to the UE.

Aspect 28. The method of Aspect 27, wherein determining the configured average floor height value comprises: obtaining an average floor height value associated with a particular multi-level structure corresponding to the horizontal position estimate.

Aspect 29. The method of any of Aspects 27 to 28, wherein determining the configured average floor height value comprises: obtaining an average floor height value associated with a particular multi-level structure type corresponding to the horizontal position estimate.

Aspect 30. The method of any of Aspects 22 to 29, wherein grouping the plurality of APs based on the DL-RSSI values comprises: identifying the first AP group based on a determination that the first subset of the plurality of APs is associated with relatively strong DL-RSSI values measured by the UE; and identifying the second AP group based on a determination that the second subset of the plurality of APs is associated with relatively weak DL-RSSI values measured by the UE.

Aspect 31. The method of Aspect 30, wherein validating the floor level estimate comprises: determining that each AP of the plurality of APs is included in the first AP group or the second AP group; and validating the floor level estimate based on a determination the floor level estimate is indicative of an uppermost floor level of a plurality of floor levels or a bottom floor level of the plurality of floor levels; or based on a determination the floor level estimate is not indicative of the uppermost floor level or the bottom floor level, updating the floor level estimate to be indicative of one of the uppermost floor level or the bottom floor level.

Aspect 32. The method of any of Aspects 30 to 31, wherein validating the floor level estimate comprises: identifying a third AP group including a third subset of the plurality of APs, wherein each AP of the third subset is associated with a respective DL-RSSI value less than the threshold and different from the respective DL-RSSI values associated with the second subset; and validating the floor level estimate based on a determination the floor level estimate is not indicative of an uppermost floor level of a plurality of floor levels or a bottom floor level of the plurality of floor levels.

Aspect 33. The method of any of Aspects 22 to 32, wherein further comprising determining the estimated vertical position of the UE based on one or more positioning signals received from a base station associated with the UE.

Aspect 34. The method of Aspect 33, further comprising: receiving estimated vertical position information corresponding to the plurality of APs, wherein the estimated vertical position information is based on respective positioning measurement signals between the base station and respective APs of the plurality of APs.

Aspect 35. The method of Aspect 34, wherein the estimated vertical position information is based on one or more of zenith angle of arrival (ZoA) information or zenith angle of departure (ZoD) information corresponding to the respective positioning measurements signals between the base station and the respective APs of the plurality of APs.

Aspect 36. The method of any of Aspects 34 to 35, further comprising receiving the estimated vertical position information corresponding to the plurality of APs from a Location Management Function (LMF) associated with the base station.

Aspect 37. The method of Aspect 36, wherein the estimated vertical position information is indicative of a respective floor level of a plurality of floor levels corresponding to a vertical position estimate for each respective AP of the plurality of APs.

Aspect 38. The method of any of Aspects 22 to 37, wherein validating the floor level estimate corresponding to the UE comprises: obtaining location information for each respective AP of the first subset, wherein the location information includes a respective vertical position associated with each respective AP of the first subset; determining a floor level estimate corresponding to the respective vertical positions associated with the first subset; and comparing the floor level estimate corresponding to the UE to the floor level estimate corresponding to the respective vertical positions associated with the first subset.

Aspect 39. The method of Aspect 38, wherein the location information for each respective AP of the first subset is crowd-sourced location information.

Aspect 40. The method of any of Aspects 22 to 39, further comprising determining the estimated vertical position of the UE based on one or more pressure measurements obtained using a pressure sensor included in the UE.

Aspect 41. The method of any of Aspects 22 to 40, wherein each respective beacon frame is a WiFi beacon frame, and wherein each AP of the plurality of APs is a WiFi AP.

Aspect 42. The method of any of Aspects 22 to 41, wherein each beacon frame is indicative of one or more additional DL-RSSI measurement values determined by a respective AP of the plurality of APs and corresponding to one or more beacon frames associated with different APs of the plurality of APs.

Aspect 43. A non-transitory computer-readable storage medium comprising instructions stored thereon which, when executed by at least one processor, causes the at least one processor to perform operations according to any of Aspects 1 to 21.

Aspect 44. A non-transitory computer-readable storage medium comprising instructions stored thereon which, when executed by at least one processor, causes the at least one processor to perform operations according to any of Aspects 22 to 42.

Aspect 45. An apparatus comprising one or more means for performing operations according to any of Aspects 1 to 21.

Aspect 46. An apparatus comprising one or more means for performing operations according to any of Aspects 22 to 42.

What is claimed is:

1. An apparatus of a user equipment (UE) for wireless communications, comprising:

at least one memory; and at least one processor coupled to the at least one memory, wherein the at least one processor is configured to:

determine, based on an estimated vertical position of the UE and a configured average floor height value, a floor level estimate corresponding to the UE;

determine a downlink Received Signal Strength Indicator (DL-RSSI) value associated with a respective beacon frame received by the UE from each access point (AP) of a plurality of APs;

group the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validate the floor level estimate corresponding to the UE based on a comparison between the floor level estimate and respective floor level information associated with the first AP group.

2. The apparatus of claim 1, wherein:

each AP of the plurality of APs is positioned on a respective floor level of a plurality of floor levels;

the floor level estimate corresponding to the UE is indicative of a particular floor level of the plurality of floor levels; and at least a portion of the first subset of the plurality of APs are positioned on the particular floor level.

3. The apparatus of claim 1, wherein, to validate the floor level estimate, the at least one processor is configured to:

determine the floor level estimate is different from the respective floor level information; and generate an updated floor level estimate corresponding to the UE, wherein the updated floor level estimate is based on the respective floor level information.

4. The apparatus of claim 3, wherein the updated floor level estimate is the same as the respective floor level information associated with each AP of the first subset of the plurality of APs.

5. The apparatus of claim 1, wherein the first subset comprises respective APs associated with a strongest set of DL-RSSI values measured by the UE for the plurality of APs.

6. The apparatus of claim 1, wherein the at least one processor is configured to determine the configured average floor height value based on a horizontal position estimate corresponding to the UE.

7. The apparatus of claim 6, wherein, to determine the configured average floor height value, the at least one processor is configured to:

obtain an average floor height value associated with a particular multi-level structure corresponding to the horizontal position estimate.

8. The apparatus of claim 6, wherein, to determine the configured average floor height value, the at least one processor is configured to:

obtain an average floor height value associated with a particular multi-level structure type corresponding to the horizontal position estimate.

9. The apparatus of claim 1, wherein, to group the plurality of APs based on the DL-RSSI values, the at least one processor is configured to:

identify the first AP group based on a determination that the first subset of the plurality of APs is associated with relatively strong DL-RSSI values measured by the UE; and and identify the second AP group based on a determination that the second subset of the plurality of APs is associated with relatively weak DL-RSSI values measured by the UE.

10. The apparatus of claim 9, wherein, to validate the floor level estimate, the at least one processor is configured to:

determine that each AP of the plurality of APs is included in the first AP group or the second AP group; and validate the floor level estimate based on a determination the floor level estimate is indicative of an uppermost floor level of a plurality of floor levels or a bottom floor level of the plurality of floor levels; or based on a determination the floor level estimate is not indicative of the uppermost floor level or the bottom floor level, update the floor level estimate to be indicative of one of the uppermost floor level or the bottom floor level.

11. The apparatus of claim 9, wherein, to validate the floor level estimate, the at least one processor is configured to:

identify a third AP group including a third subset of the plurality of APs, wherein each AP of the third subset is associated with a respective DL-RSSI value less than the threshold and different from the respective DL-RSSI values associated with the second subset; and validate the floor level estimate based on a determination the floor level estimate is not indicative of an uppermost floor level of a plurality of floor levels or a bottom floor level of the plurality of floor levels.

12. The apparatus of claim 1, wherein the at least one processor is configured to determine the estimated vertical position of the UE based on one or more positioning signals received from a base station associated with the UE.

13. The apparatus of claim 12, wherein the at least one processor is further configured to:

receive estimated vertical position information corresponding to the plurality of APs, wherein the estimated vertical position information is based on respective positioning measurement signals between the base station and respective APs of the plurality of APs.

14. The apparatus of claim 13, wherein the estimated vertical position information is based on one or more of zenith angle of arrival (ZoA) information or zenith angle of departure (ZoD) information corresponding to the respective positioning measurements signals between the base station and the respective APs of the plurality of APs.

15. The apparatus of claim 13, wherein the at least one processor is configured to receive the estimated vertical position information corresponding to the plurality of APs from a Location Management Function (LMF) associated with the base station.

16. The apparatus of claim 15, wherein the estimated vertical position information is indicative of a respective floor level of a plurality of floor levels corresponding to a vertical position estimate for each respective AP of the plurality of APs.

17. The apparatus of claim 1, wherein, to validate the floor level estimate corresponding to the UE, the at least one processor is configured to:

obtain location information for each respective AP of the first subset, wherein the location information includes a respective vertical position associated with each respective AP of the first subset;

determine a floor level estimate corresponding to the respective vertical positions associated with the first subset; and compare the floor level estimate corresponding to the UE to the floor level estimate corresponding to the respective vertical positions associated with the first subset.

18. The apparatus of claim 17, wherein the location information for each respective AP of the first subset is crowd-sourced location information.

19. The apparatus of claim 1, wherein the at least one processor is configured to determine the estimated vertical position of the UE based on one or more pressure measurements obtained using a pressure sensor included in the UE.

20. The apparatus of claim 1, wherein each respective beacon frame is a WiFi beacon frame, and wherein each AP of the plurality of APs is a WiFi AP.

21. The apparatus of claim 1, wherein each beacon frame is indicative of one or more additional DL-RSSI measurement values determined by a respective AP of the plurality of APs and corresponding to one or more beacon frames associated with different APs of the plurality of APs.

22. A method for wireless communications by a user equipment (UE), comprising:

determining, based on an estimated vertical position of the UE and a configured average floor height value, a floor level estimate corresponding to the UE;

determining a downlink Received Signal Strength Indicator (DL-RSSI) value associated with a respective beacon frame received by the UE from each access point (AP) of a plurality of APs;

grouping the plurality of APs based on the DL-RSSI values to determine AP group information, wherein the AP group information is indicative of a first AP group including a first subset of the plurality of APs associated with DL-RSSI values greater than a threshold, and a second AP group including a second subset of the plurality of APs associated with DL-RSSI values less than the threshold; and validating the floor level estimate corresponding to the UE based on a comparison between the floor level estimate and respective floor level information associated with the first AP group.

23. The method of claim 22, wherein:

each AP of the plurality of APs is positioned on a respective floor level of a plurality of floor levels;

the floor level estimate corresponding to the UE is indicative of a particular floor level of the plurality of floor levels; and at least a portion of the first subset of the plurality of APs are positioned on the particular floor level.

24. The method of claim 22, wherein validating the floor level estimate comprises:

determining the floor level estimate is different from the respective floor level information; and generating an updated floor level estimate corresponding to the UE, wherein the updated floor level estimate is based on the respective floor level information.

25. The method of claim 24, wherein the updated floor level estimate is the same as the respective floor level information associated with each AP of the first subset of the plurality of APs.

26. The method of claim 22, wherein the first subset comprises respective APs associated with a strongest set of DL-RSSI values measured by the UE for the plurality of APs.

27. The method of claim 22, wherein the configured average floor height value is determined based on a horizontal position estimate corresponding to the UE.

28. The method of claim 27, wherein determining the configured average floor height value comprises:

obtaining an average floor height value associated with a particular multi-level structure corresponding to the horizontal position estimate.

29. The method of claim 27, wherein determining the configured average floor height value comprises:

obtaining an average floor height value associated with a particular multi-level structure type corresponding to the horizontal position estimate.

30. The method of claim 22, wherein grouping the plurality of APs based on the DL-RSSI values comprises:

identifying the first AP group based on a determination that the first subset of the plurality of APs is associated with relatively strong DL-RSSI values measured by the UE; and and identifying the second AP group based on a determination that the second subset of the plurality of APs is associated with relatively weak DL-RSSI values measured by the UE.

* * * * *